US012240692B2

(12) United States Patent
Maroney et al.

(10) Patent No.: US 12,240,692 B2
(45) **Date of Patent: *Mar. 4, 2025**

(54) SEMI-AUTONOMOUS REFUSE COLLECTION

(71) Applicant: The Heil Co., Chattanooga, TN (US)

(72) Inventors: Stanley L. Maroney, Attalla, AL (US); David G. Lewis, Chattanooga, TN (US); Robert B. Williams, Albertville, AL (US)

(73) Assignee: The Heil Co., Chattanooga, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/185,948

(22) Filed: Mar. 17, 2023

(65) Prior Publication Data

US 2023/0242336 A1 Aug. 3, 2023

Related U.S. Application Data

(60) Division of application No. 17/734,624, filed on May 2, 2022, now Pat. No. 11,608,226, which is a (Continued)

(51) Int. Cl.
*B66F 3/04* (2006.01)
*B65F 3/04* (2006.01)
*B65F 3/02* (2006.01)

(52) U.S. Cl.
CPC ........ *B65F 3/04* (2013.01); *B65F 2003/0276* (2013.01)

(58) Field of Classification Search
CPC ...... B65F 3/24; B65F 3/26; B65F 3/28; B65F 2003/023; B65F 2003/0266;
(Continued)

(56) References Cited

U.S. PATENT DOCUMENTS

| | | | |
|---|---|---|---|
| 2,949,199 | A | 8/1960 | Jones |
| 4,868,796 | A | 9/1989 | Ahrens et al. |

(Continued)

FOREIGN PATENT DOCUMENTS

| | | |
|---|---|---|
| EP | 0214453 | 3/1987 |
| EP | 0955252 | 11/1999 |

(Continued)

OTHER PUBLICATIONS

Eagle VisionSystems.com, "Bin-Seeker," 2017, retrieved from <http://eaglevisionsystems.com/EagleVision Bin-Seeker Datasheet.pdf>, 3 pages.

(Continued)

*Primary Examiner* — Mark C Hageman
(74) *Attorney, Agent, or Firm* — Fish & Richardson P.C.

(57) ABSTRACT

Operating a refuse collection vehicle to collect refuse from a refuse container includes positioning a refuse collection vehicle with respect to a refuse container to be emptied, and manually engaging a switch to initiate a dump cycle to be performed by the refuse collection vehicle on the refuse container. The dump cycle includes engaging the refuse container with a portion of the vehicle, lifting the engaged refuse container to a dump position, and moving the refuse container to release contents of the refuse container into a hopper of the refuse collection vehicle. The dump cycle continues to completion as long as the switch remains manually engaged.

20 Claims, 12 Drawing Sheets

Related U.S. Application Data continuation of application No. 16/781,857, filed on Feb. 4, 2020, now Pat. No. 11,319,147.

(60) Provisional application No. 62/800,985, filed on Feb. 4, 2019.

(58) Field of Classification Search
CPC ...... B65F 2003/0276; B65F 2003/0283; B65F 3/02; B65F 3/04
See application file for complete search history.

(56) References Cited

U.S. PATENT DOCUMENTS

| | | | |
|---|---|---|---|
| 5,004,392 | A | 4/1991 | Naab |
| 5,007,786 | A | 4/1991 | Bingman |
| 5,215,423 | A | 6/1993 | Schulte-Hinsken et al. |
| 5,601,392 | A | 2/1997 | Smith et al. |
| 5,755,547 | A | 5/1998 | Flerchinger et al. |
| 5,762,461 | A | 6/1998 | Fröhlingsdorf |
| 5,851,100 | A | 12/1998 | Brandt |
| 5,938,710 | A | 8/1999 | Lanza et al. |
| 5,967,731 | A | 10/1999 | Brandt |
| 6,004,092 | A | 12/1999 | Johnson et al. |
| 6,152,673 | A | 11/2000 | Anderson et al. |
| 6,520,008 | B1 | 2/2003 | Stragier |
| 7,070,382 | B2 | 7/2006 | Pruteanu et al. |
| 7,072,745 | B2 | 7/2006 | Pillar et al. |
| 7,219,769 | B2 | 5/2007 | Yamanouchi et al. |
| 7,980,808 | B2 | 7/2011 | Chilson et al. |
| 8,753,062 | B2 | 6/2014 | Curotto |
| 8,833,823 | B2 | 9/2014 | Price et al. |
| 9,296,326 | B1 | 3/2016 | Young |
| 9,403,278 | B1 | 8/2016 | Van Kampen et al. |
| 9,580,014 | B2 | 2/2017 | Lucas et al. |
| 9,926,135 | B2 | 3/2018 | Whitfield, Jr. et al. |
| 10,048,398 | B2 | 8/2018 | Rose et al. |
| 10,196,206 | B2 | 2/2019 | Whitfield, Jr. et al. |
| 10,661,986 | B2 | 5/2020 | Price et al. |
| 10,831,201 | B2 | 11/2020 | Spence |
| 10,974,895 | B2 | 4/2021 | McNeilus et al. |
| 11,208,262 | B2 | 12/2021 | Lewis et al. |
| 11,453,550 | B2 | 9/2022 | Maroney et al. |
| 11,603,265 | B2 | 3/2023 | Williams et al. |
| 11,608,226 | B2 | 3/2023 | Maroney et al. |
| 11,807,450 | B2 | 11/2023 | Lewis et al. |
| 11,858,735 | B2 | 1/2024 | Maroney et al. |
| 2002/0159870 | A1 | 10/2002 | Pruteanu et al. |
| 2003/0031543 | A1 | 2/2003 | Elbrink |
| 2006/0061481 | A1 | 3/2006 | Kurple et al. |
| 2008/0089764 | A1 | 4/2008 | Vistro |
| 2008/0199298 | A1 | 8/2008 | Chilson et al. |
| 2009/0114485 | A1 | 5/2009 | Eggert |
| 2009/0271058 | A1 | 10/2009 | Chilson |
| 2013/0039728 | A1 | 2/2013 | Price et al. |
| 2015/0093221 | A1 | 4/2015 | Parker |
| 2016/0355335 | A1 | 12/2016 | Whitfield, Jr. et al. |
| 2017/0243369 | A1 | 8/2017 | Iida et al. |
| 2017/0362030 | A1 | 12/2017 | Steimel |
| 2017/0369242 | A1 | 12/2017 | McNeilus et al. |
| 2018/0319640 | A1 | 11/2018 | Flenoid |
| 2018/0319642 | A1 | 11/2018 | Pronger et al. |
| 2018/0346241 | A1 | 12/2018 | Errington et al. |
| 2019/0225422 | A1 | 7/2019 | Wrigley et al. |
| 2019/0325220 | A1 | 10/2019 | Wildgrube et al. |
| 2020/0247609 | A1 | 8/2020 | Maroney et al. |
| 2020/0339345 | A1 | 10/2020 | Lewis et al. |
| 2020/0339346 | A1 | 10/2020 | Maroney et al. |
| 2020/0339347 | A1 | 10/2020 | Williams et al. |
| 2020/0342240 | A1 | 10/2020 | Szoke-Sieswerda et al. |
| 2022/0106113 | A1 | 4/2022 | Lewis et al. |
| 2022/0234822 | A1 | 7/2022 | Maroney et al. |
| 2022/0258966 | A1 | 8/2022 | Maroney et al. |
| 2024/0034555 | A1 | 2/2024 | Lewis et al. |

FOREIGN PATENT DOCUMENTS

| | | |
|---|---|---|
| EP | 1020375 | 7/2000 |
| EP | 3284704 | 2/2018 |
| FR | 3045027 | 6/2017 |
| JP | H09-208199 | 8/1997 |
| JP | H09-210594 | 8/1997 |
| JP | 2009-241247 | 10/2009 |
| JP | 2016-068233 | 5/2016 |
| JP | 2017-178567 | 10/2017 |
| KR | 10-0846313 | 7/2008 |
| WO | WO 2013055309 | 4/2013 |
| WO | WO 2020163383 | 8/2020 |

OTHER PUBLICATIONS

Eagle VisionSystems.com, "Vision Systems," Aug. 2015, retrieved from URL <http://eaglevisionsystems.com/vision.html>, 1 page.

EP Search Report in European Appln. No. 20752428.1, dated Feb. 25, 2022, 14 pages.

Extended European Search Report in European Appln. No. 20795932.1, dated May 13, 2022, 10 pages.

PCT International Search Report and Written Opinion in International Application No. PCT/US2020/016648, dated Jun. 3, 2020, 11 pages.

PCT International Search Report and Written Opinion in International Application No. PCT/US2020/029637, dated Jul. 24, 2020, 11 pages.

PCT International Search Report and Written Opinion in International Application No. PCT/US2020/029639, dated Jul. 29, 2020, 11 pages.

PCT International Search Report and Written Opinion in International Application No. PCT/US2020/029646, dated Jul. 29, 2020, 10 pages.

Office Action in European Appln. No. 20795932.1, mailed on Mar. 25, 2024, 7 pages.

Office Actionin Canadian Appln. No. 3,129,088, mailed on Sep. 23, 2024, 4 pages.

SEMI-AUTONOMOUS REFUSE COLLECTION

CROSS-REFERENCE TO RELATED APPLICATIONS

This application is a divisional of U.S. patent application Ser. No. 17/734,624, entitled "Semi-Autonomous Refuse Collection," filed May 2, 2022, which is a continuation of U.S. patent application Ser. No. 16/781,857, entitled "Semi-Autonomous Refuse Collection," filed Feb. 4, 2020, now U.S. Pat. No. 11,319,147, which claims the benefit under 35 U.S.C. § 119(e) of U.S. Patent Application No. 62/800,985, entitled "Semi-Autonomous Arm Control," filed Feb. 4, 2019, which are incorporated herein by reference in their entirety.

TECHNICAL FIELD

This invention relates to systems and methods for operating a refuse collection vehicle to lift and empty refuse containers.

BACKGROUND

Refuse collection vehicles have been used for generations for the collection and transfer of waste. Traditionally, collection of refuse with a refuse collection vehicle required two people: (1) a first person to drive the vehicle and (2) a second person to pick up containers containing waste and dump the waste from the containers into the refuse collection vehicle. Technological advances have recently been made to reduce the amount of human involvement required to collect refuse. For example, some refuse collection vehicles include features that allow for collection of refuse with a single operator, such as mechanical and robotic lift arms, eliminating the need for a second person to pick up and dump the containers.

SUMMARY

Many aspects of the invention feature operating a refuse collection vehicle to perform semi-autonomous refuse collection and ejection. By semi-autonomous, we mean that the process involves the input of a human operator but that at least some sequential steps of the process are completed without varying operator input.

In some implementations, operating a refuse collection vehicle to collect refuse from a refuse container includes positioning a refuse collection vehicle with respect to a refuse container to be emptied, and manually engaging a switch to initiate a dump cycle to be performed by the refuse collection vehicle on the refuse container. The dump cycle includes engaging the refuse container with a portion of the vehicle, lifting the engaged refuse container to a dump position, and moving the refuse container to release contents of the refuse container into a hopper of the refuse collection vehicle. The dump cycle continues to completion as long as the switch remains manually engaged.

Implementations of the general aspect may each optionally include one or more of the following features.

Positioning the refuse collection vehicle with respect to a refuse container to be emptied may include positioning the refuse collection vehicle such that a plurality of sensors on the vehicle are positioned to detect the refuse container.

In some cases, the plurality of sensors includes at least one of the group consisting of a mechanical plunger, a contact sensor, an analog sensor, a digital sensor, a RADAR sensor, a LIDAR sensor, an ultrasonic sensor, a controller area network bus sensor, or a camera.

In some cases, a light inside the refuse collection vehicle indicates that the refuse container is detected by at least two sensors of the plurality of sensors. In some cases, the switch is energized when a refuse container is detected by at least two sensors of the plurality of sensors. A light inside the refuse collection vehicle may indicate that the switch is energized.

In some cases, positioning the refuse collection vehicle with respect to a refuse container to be emptied includes positioning the refuse collection vehicle in a fore-aft direction while observing images on a graphical display within the vehicle obtained from a camera directed at the refuse container to align a feature of an image of the refuse container on the graphical display with a visual marker positioned on the graphical display.

Engaging the refuse container with a portion of the vehicle can include extending an arm of the refuse collection vehicle outward from a side of the refuse collection vehicle until the refuse container is detected by at least one of a plurality of sensors. In some cases, one or more grippers of the arm move toward the refuse container in response to detection of the refuse container by a sensor carried on the refuse collection vehicle. In some cases, one or more grippers continue to move toward the refuse container until a threshold pressure applied to the refuse container by the arm is reached. In some cases, the threshold pressure is adjustable by an operator of the vehicle.

Lifting the container to a dump position may further include leveling the refuse container to prevent the contents of the refuse container from spilling. In some cases, the refuse collection vehicle continuously levels the refuse container while lifting the engaged refuse container to a dump position. In some cases, the engaged refuse container is leveled when the refuse container is lifted to an elevation corresponding to a top of a windshield of the refuse collection vehicle. In some cases, the refuse container is leveled relative to a surface the vehicle is positioned on during the dump cycle.

Moving the refuse container to release contents of the refuse container into a hopper of the refuse collection vehicle may include pivoting the refuse container one or more times to dump the contents to a specified location in the hopper of refuse collection vehicle. In some cases, moving the refuse container includes delaying a predetermined amount of time between two consecutive pivots of the refuse container. In some cases, the amount of time is selectable by an operator of the vehicle.

In some cases, the dump cycle further includes before lifting the engaged refuse container, recording a pick position of the refuse container, and, after moving the refuse container to release the contents, lowering the refuse container to the recorded pick position.

The refuse collection vehicle may contain an environmental monitoring sensor responsive to proximity of a potential hazard. In some cases, the dump cycle is automatically stopped in response to a signal from the environmental monitoring sensor. In some cases, the stopped dump cycle automatically resumes in response to a signal from the environmental monitoring sensor indicating the potential hazard has departed.

In some cases, the dump cycle is automatically stopped upon disengaging the switch. In some cases, the dump cycle includes reengaging the switch to cause the dump cycle to continue to completion as long as the switch remains manually engaged.

Operating a refuse collection vehicle to collect refuse from a refuse container may further include, after completion of the dump cycle, positioning an arm of the refuse collection vehicle in a travel position. In some cases, positioning an arm of the refuse collection vehicle in a travel position includes engaging a second switch.

In another general aspect, operating a refuse collection vehicle to collect refuse from a refuse container includes positioning the refuse collection vehicle adjacent a refuse container, lifting the container by operating an arm of the refuse collection vehicle, and dumping a contents of the refuse container into a hopper of the refuse collection vehicle, and positioning the refuse collection vehicle includes positioning the refuse collection vehicle in a fore-aft direction while observing images on a graphical display within the vehicle obtained from a camera directed at the refuse container, to align a feature of an image of the refuse container on the graphical display with a visual marker positioned on the graphical display.

Implementations of the general aspect may each optionally include one or more of the following features.

The visual marker may include a first guideline and a second guideline, and the distance on the graphical display between the first guideline and the second guideline is greater than or equal to a distance between a first side of the image of the refuse container on the graphical display and second side of the image of the refuse container on the graphical display. Aligning a feature of the image of the refuse container on the graphical display with a visual marker positioned on the graphical display may include aligning the image of the refuse container between the first guideline and the second guideline.

In some cases, the visual marker includes a third guideline, the third guideline being disposed equidistant between the first guideline and second guideline. In some cases, aligning a feature of the image of the refuse container on the graphical display with a visual marker positioned on the graphical display includes aligning a centerline of the image of the refuse container with the third guideline.

In some cases, the graphical display includes a display of a virtual reality device worn by the operator.

In another general aspect, operating a refuse collection vehicle to eject refuse from a body of the refuse collection vehicle includes manually engaging a switch to initiate an ejection cycle to be performed by the refuse collection vehicle on contents of the body. The ejection cycle includes unlocking a tailgate of the vehicle, lifting the tailgate of the vehicle, and moving a packer of the vehicle to eject contents of the body of the refuse collection vehicle.

Implementations of the general aspect may each optionally include one or more of the following features.

Moving the packer to eject contents of the body of the refuse collection vehicle may include extending and retracting the packer one or more times to eject the contents of the body of the refuse collection vehicle. In some cases, the packer extends to a full eject position and retracts to a second position, the second position being a predetermined distance from the full eject position.

In some cases, a light inside the refuse collection vehicle indicates that the ejection cycle is complete.

The ejection cycle may further include moving the packer to a home position. In some cases, the ejection cycle further includes lowering the tailgate to a closed position, and locking the tailgate.

In some cases, the ejection cycle continues to completion as long as the switch remains manually engaged. In some cases, the ejection cycle is automatically stopped upon disengaging the switch. In some cases, the ejection cycle further includes reengaging the switch to cause the ejection cycle to continue to completion as long as the switch remains manually engaged.

In another general aspect, collecting refuse from a refuse container near a refuse collection vehicle includes initiating a dump cycle in electronic response to a signal or data from at least one sensor or camera indicating that the refuse container is in a position to be engaged for dumping, and then in response to completion of the dump cycle, lowering the refuse container to a release position. The dump cycle includes engaging the refuse container with a portion of the vehicle, lifting the engaged refuse container to a dump position, and moving the refuse container to release contents of the refuse container into a hopper of the refuse collection vehicle. In some implementations, the signal or data from at least one sensor or camera indicating that the refuse container is in a position to be engaged for dumping is provided to a computing device, the computing device processes the signal or data, and, based on the processing of the signal or data, the computing device provides an electronic signal. In some implementations, the computing device is an onboarding computing device of the refuse collection vehicle. By "in electronic response" we mean that the dump cycle process is initialized and conducted by the refuse collection vehicle independently of any action of a human operator of the vehicle.

Implementations of the general aspect may each optionally include one or more of the following features.

In some cases, the dump cycle is initiated in response to an evaluation of image data collected by one or more imaging devices of the vehicle. In some cases, the image data includes an image of the refuse container. In some cases, the image data is processed by a computing system using machine learning techniques. In some cases, the computing system includes a computing device of the refuse collection vehicle.

Collecting refuse from a refuse container near a refuse collection vehicle may further include, prior to initiating the dump cycle, positioning the vehicle with respect to the refuse container. In some cases, the vehicle is positioned with respect to the refuse container in response to processing optical sensor data collected by the vehicle. In some cases, the optical sensor data is provided by a plurality of optical sensors on the vehicle positioned to detect the refuse container.

Other implementations include corresponding systems, apparatus, and computer programs, configured to perform the actions of the methods, encoded on computer storage devices.

Potential benefits of the one or more implementations described in the present specification may include increased waste collection efficiency and reduced operator error in refuse collection. The one or more implementations may also reduce the likelihood of damaging refuse containers and refuse collection vehicles during the refuse collection process. Further, the one or more implementations may allow for more complete dumping of refuse from a refuse container into a refuse collection vehicle, as well as more complete ejection of refuse from the body of a refuse collection vehicle.

It is appreciated that methods in accordance with the present specification may include any combination of the aspects and features described herein. That is, methods in accordance with the present specification are not limited to the combinations of aspects and features specifically described herein, but also include any combination of the aspects and features provided.

The details of one or more implementations of the present specification are set forth in the accompanying drawings and the description below. Other features and advantages of the present specification will be apparent from the description and drawings, and from the claims.

DESCRIPTION OF DRAWINGS

Like reference symbols in the various drawings indicate like elements.

DETAILED DESCRIPTION

Figure 1A:
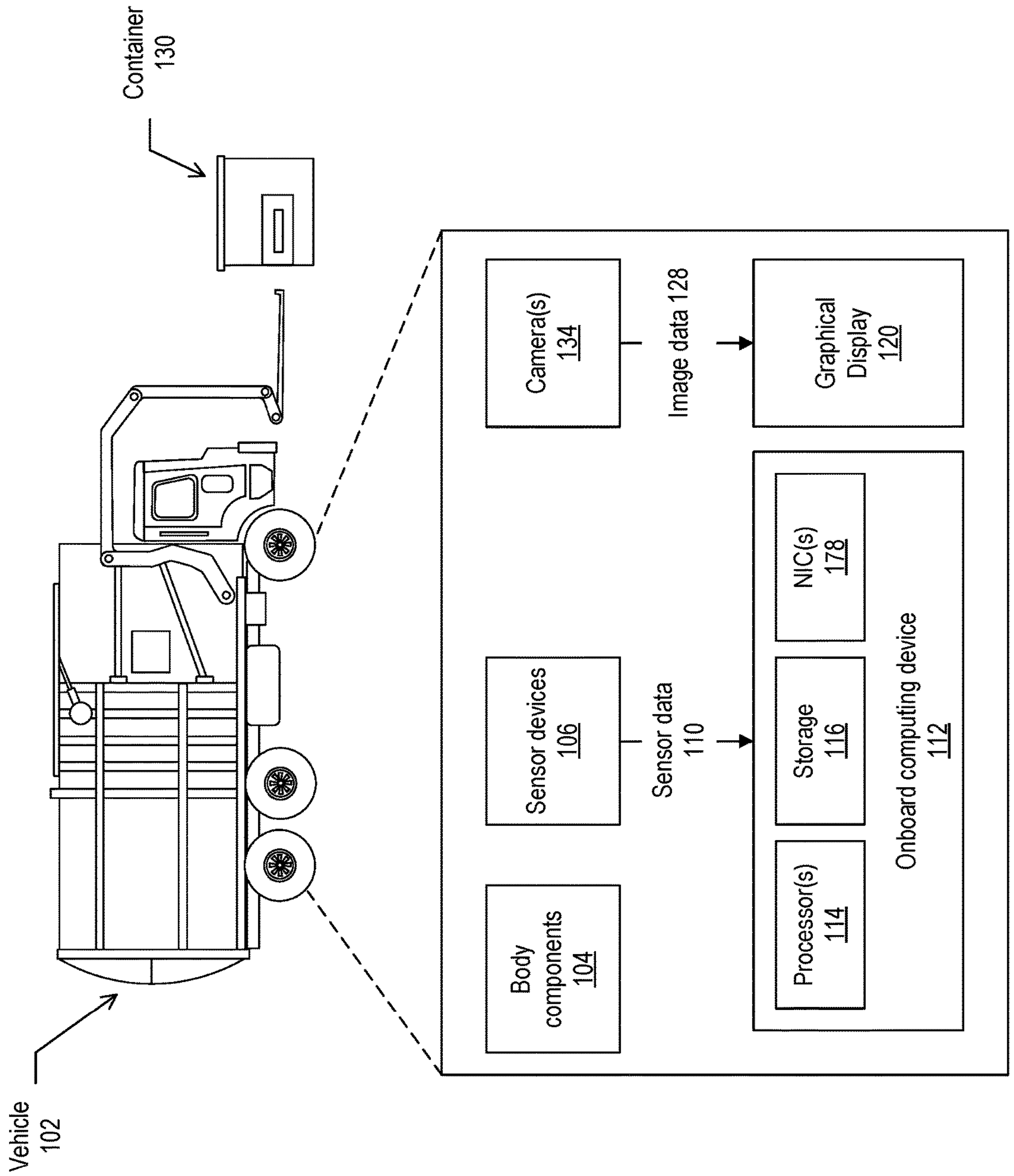
FIG. 1A depicts an example system for collection of refuse.

FIG. 1A depicts an example system for collection of refuse. Vehicle 102 is a refuse collection vehicle that operates to collect and transport refuse (e.g., garbage). The refuse collection vehicle 102 can also be described as a garbage collection vehicle, or garbage truck. The vehicle 102 is configured to lift containers 130 that contain refuse, and empty the refuse in the containers into a hopper of the vehicle 102, to enable transport of the refuse to a collection site, compacting of the refuse, and/or other refuse handling activities.

The body components 104 of the vehicle 102 can include various components that are appropriate for the particular type of vehicle 102. For example, a garbage collection vehicle may be a truck with an automated side loader (ASL). Alternatively, the vehicle may be a front-loading truck, a rear loading truck, a roll off truck, or some other type of garbage collection vehicle. A vehicle with an ASL, such as the example shown in FIGS. 2A-2C, may include body components involved in the operation of the ASL, such as arms and/or a fork, as well as other body components such as a pump, a tailgate, a packer, and so forth. A front-loading vehicle, such as the example shown in FIGS. 1A and 1B, may include body components such as a pump, tailgate, packer, grabber, and so forth. A rear loading vehicle may include body components such as a pump, blade, tipper, and so forth. A roll off vehicle may include body components such as a pump, hoist, cable, and so forth. Body components may also include other types of components that operate to bring garbage into a hopper (or other storage area) of a truck, compress and/or arrange the garbage in the storage area or body, and/or expel the garbage from the body.

The vehicle 102 can include any number of body sensor devices 106 that sense body component(s) and generate sensor data 110 describing the operation(s) and/or the operational state of various body components 104. The body sensor devices 106 are also referred to as sensor devices, or sensors. Sensors may be arranged in the body components, or in proximity to the body components, to monitor the operations of the body components. The sensors 106 emit signals that include the sensor data 110 describing the body component operations, and the signals may vary appropriately based on the particular body component being monitored. Sensors may also be arranged to provide sensor data 110 describing the position of external objects, such as a refuse container. In some implementations, the sensor data 110 is analyzed, by a computing device on the vehicle and/or by remote computing device(s), to identify the presence of a triggering condition based at least partly on the operational state of one or more body components, as described further below.

Sensors 106 can be provided on the vehicle body to evaluate cycles and/or other parameters of various body components. For example, the sensors can measure the hydraulic pressure of various hydraulic components, and/or pneumatic pressure of pneumatic components. As described in further detail herein, the sensors can also detect and/or measure the particular position and/or operational state of body components such as the top door of a refuse collection vehicle, an automated carrying can attached to a refuse collection vehicle, such as those sold under the name Curotto-Can™, a lift arm, a refuse compression mechanism, a tailgate, and so forth, to detect events such as a lift arm cycle, a pack cycle, a tailgate open or close event, an eject event, tailgate locking event, and/or other body component operations.

In some implementations, the sensor data may be communicated from the sensors to an onboard computing device 112 in the vehicle 102. In some instances, the onboard computing device is an under-dash device (UDU), and may also be referred to as the Gateway. Alternatively, the device 112 may be placed in some other suitable location in or on the vehicle. The sensor data may be communicated from the sensors to the onboard computing device 112 over a wired connection (e.g., an internal bus) and/or over a wireless connection. In some implementations, a Society of Automotive Engineers standard J1939 bus in conformance with International Organization of Standardization (ISO) standard 11898 connects the various sensors with the onboard computing device. In some implementations, a Controller Area Network (CAN) bus connects the various sensors with the onboard computing device. In some implementations, the sensors may be incorporated into the various body components. Alternatively, the sensors may be separate from the body components. In some implementations, the sensors digitize the signals that communicate the sensor data before sending the signals to the onboard computing device, if the signals are not already in a digital format.

The analysis of the sensor data 110 is performed at least partly by the onboard computing device 112, e.g., by processes that execute on the processor(s) 114. For example, the onboard computing device 112 may execute processes that perform an analysis of the sensor data 110 to detect the presence of a triggering condition, such as a lift arm being in a particular position in its cycle to empty a container into the hopper of the vehicle.

The onboard computing device 112 can include one or more processors 114 that provide computing capacity, data storage 116 of any suitable size and format, and network interface controller(s) 178 that facilitate communication of the device 112 with other device(s) over one or more wired or wireless networks.

In some implementations, a vehicle includes a body controller that manages and/or monitors various body components of the vehicle. The body controller of a vehicle can be connected to multiple sensors in the body of the vehicle. The body controller can transmit one or more signals over the J1939 network, or other wiring on the vehicle, when the body controller senses a state change from any of the sensors. These signals from the body controller can be received by the onboard computing device 112 that is monitoring the J1939 network.

In some implementations, the onboard computing device is a multi-purpose hardware platform. The device can include a UDU (Gateway) and/or a window unit (WU) (e.g., camera) to record video and/or audio operational activities of the vehicle. The onboard computing device hardware subcomponents can include, but are not limited to, one or more of the following: a CPU, a memory or data storage unit, a CAN interface, a CAN chipset, NIC(s) such as an Ethernet port, USB port, serial port, I2c lines(s), and so forth, I/O ports, a wireless chipset, a global positioning system (GPS) chipset, a real-time clock, a micro SD card, an audio-video encoder and decoder chipset, and/or external wiring for CAN and for I/O. The device can also include temperature sensors, battery and ignition voltage sensors, motion sensors, CAN bus sensors, an accelerometer, a gyroscope, an altimeter, a GPS chipset with or without dead reckoning, and/or a digital can interface (DCI). The DCI cam hardware subcomponent can include the following: CPU, memory, can interface, can chipset, Ethernet port, USB port, serial port, I2c lines, I/O ports, a wireless chipset, a GPS chipset, a real-time clock, and external wiring for CAN and/or for I/O. In some implementations, the onboard computing device is a smartphone, tablet computer, and/or other portable computing device that includes components for recording video and/or audio data, processing capacity, transceiver(s) for network communications, and/or sensors for collecting environmental data, telematics data, and so forth.

In some implementations, one or more cameras 134 can be mounted on the vehicle 102 or otherwise present on or in the vehicle 102. The camera(s) 134 each generate image data 128 that includes one or more images of a scene external to and in proximity to the vehicle 102 and/or image(s) of an interior of the vehicle 102. In some implementations, one or more cameras 134 are arranged to capture image(s) and/or video of a container 130 before, after, and/or during the operations of body components 104 to empty the container 130 into the hopper of the vehicle 102. For example, for a front-loading vehicle, the camera(s) 134 can be arranged to image objects dumped into the hopper of the vehicle. As another example, for a side loading vehicle, the camera(s) 134 can be arranged to image objects to the side of the vehicle, such as a side that mounts the ASL to lift containers. In some implementations, camera(s) 134 can capture video of a scene external to and in proximity to the vehicle 102.

In some implementations, the camera(s) 134 are communicably coupled to a graphical display 120 to communicate images and/or video captured by the camera(s) 134 to the graphical display 120. In some implementations, the graphical display 120 is placed within the interior of the vehicle. For example, the graphical display 120 can be placed within the cab of vehicle 102 such that the images and/or video can be viewed by an operator of the vehicle 102 on a graphical display 120. In some implementations, the graphical display includes a screen 122 and images and/or video can be viewed by an operator of the vehicle 102 on the screen 122. In some implementations, the display 120 is a heads-up display that projects images and/or video onto a windshield of the vehicle 102 for viewing by the operator. In some implementations, the images and/or video captured by the camera(s) 134 can be communicated to a graphical display 120 of the onboard computing device 112 in the vehicle 102. Images and/or video captured by the camera(s) 134 can be communicated from the sensors to the onboard computing device 112 over a wired connection (e.g., an internal bus) and/or over a wireless connection. In some implementations, a J1939 bus connects the camera(s) with the onboard computing device. In some implementations, the camera(s) are incorporated into the various body components. Alternatively, the camera(s) may be separate from the body components.

Figure 1B:
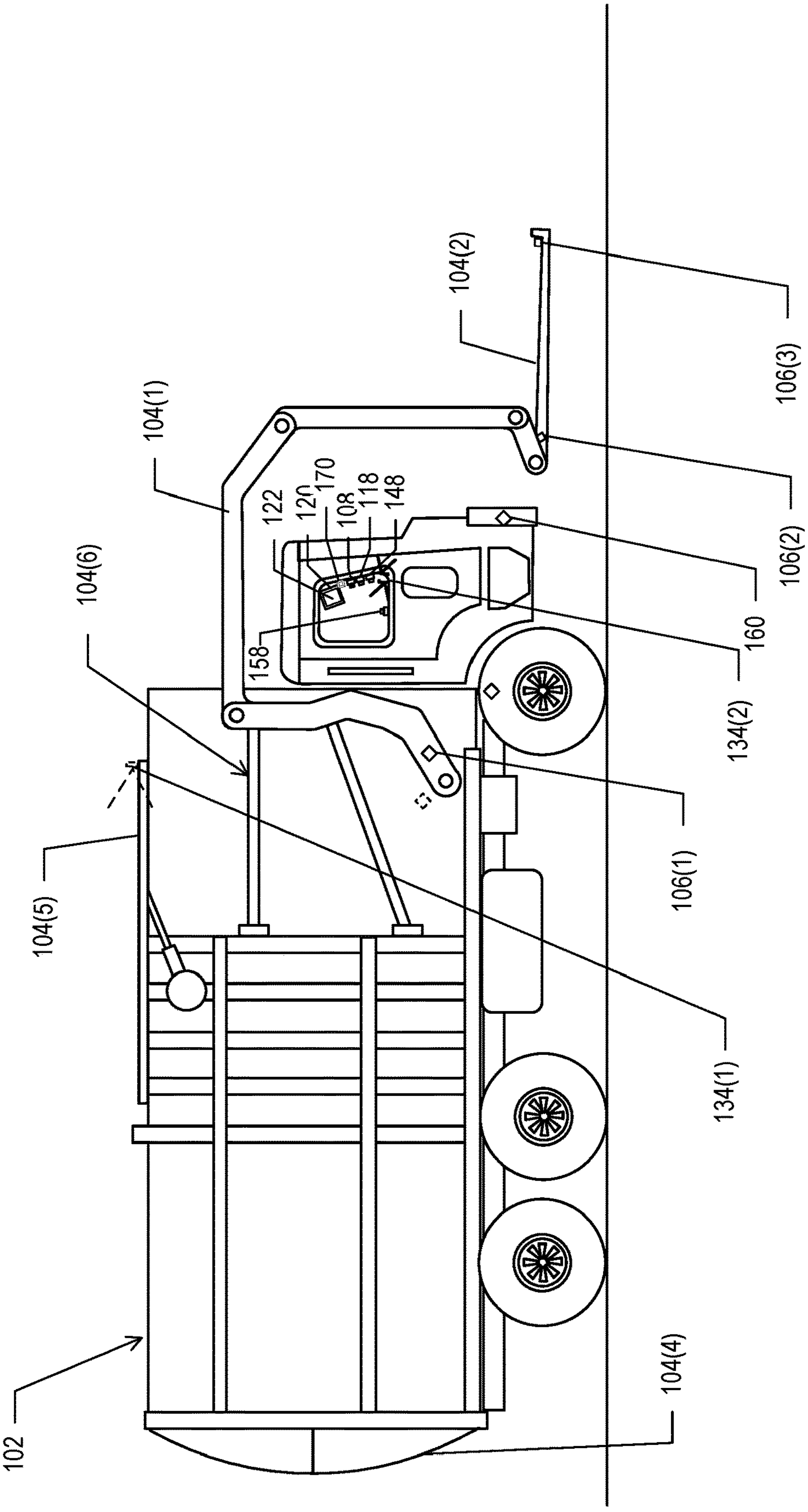
FIG. 1B depicts an example schematic of a refuse collection vehicle.

FIG. 1B depicts an example schematic of a refuse collection vehicle. As shown in the example of FIG. 1B, vehicle 102 includes various body components 104 including, but not limited to: a lift arm 104(1), a fork mechanism 104(2), a back gate or tailgate 104(4), a hopper 104(5) to collect refuse during operation, and an ejection cylinder 104(6) coupled to a packer.

One or more sensors 106 can be situated to determine the state and/or detect the operations of the body components 104. In the example shown, the lift arm 104(1) includes an arm position sensor 106(1) that is arranged to detect the position of the arm 104(1), such as during its dump cycle of lifting a container 130 and emptying its contents into the hopper 104(5). The sensor data provided by arm position sensor 106(1) can be analyzed to monitor a dump cycle being conducted by the refuse collection vehicle. For example, the arm position sensor 106(1) can provide data about the current position of the lift arm 104(1), which, as described in further detail herein, can be used to determine the current step being conducted in a dump cycle being performed by the vehicle. In some implementations, position sensor 106(1) is located in a cylinder of lift arm 104(1). In some implementations, position sensor 106(1) is located on the outside of a housing containing a cylinder of lift arm 104(1).

In FIG. 1B, container detection sensors 106(2), 106(3) are arranged on the fork mechanism 104(2) of the refuse collection vehicle 102 to detect the presence and position of a refuse container 130. For example, container detection sensors 106(2), 106(3) detect whether a container is fully engaged by the fork mechanism 104(2). In some implementations, the fork mechanism 104(2) includes multiple sensors 106 that detect container position. For example, fork mechanism 104(2) can include one or more container detection sensors 106 located on a left fork of the fork mechanism 104(2), one or more container detection sensors 106 located on a right fork of the fork mechanism 104(2), and one or more container detection sensors 106 located on the crossbar between the left and right fork of the fork mechanism 104(2). Multiple container detection sensors 106 can be implemented to provide redundancy in can detection.

Sensors 106 can include, but are not limited to, a mechanical plunger, a contact sensor, an analog sensor, a digital sensor, a CAN bus sensor, a radio detection and ranging (RADAR) sensor, a light detection and ranging (LIDAR) sensor, an ultrasonic sensor, a camera, or a combination thereof. In some implementations, the container detection sensors 106(2), 106(3) include one or more analog ultrasonic sensors. In some implementations, container detection sensors 106(2), 106(3) include one or more mechanical plungers. In some implementations, the container detection sensors 106(2), 106(3) include one or more CAN bus sensors.

The vehicle 102 also includes one or more camera 134. In the example shown in FIG. 1B, a camera 134(1) is positioned to visualize refuse in the vehicle 102 or refuse falling into the vehicle 102, such as refuse in the hopper of the vehicle 102. Additionally, vehicle 102 includes one or more cameras 134(2) placed within the cab of the vehicle 102. For example, two cameras 134(2) can be contained within a housing inside the vehicle 102, wherein a first camera is oriented to capture images of inside the cab of the vehicle 102 and a second camera is oriented to capture images of the exterior of the vehicle 102 through a windshield of the vehicle 102. The camera(s) 134 may also be placed in other positions and/or orientations. For example, in some implementations, the camera(s) 134 can be positioned to capture images and/or video of refuse containers to be engaged by and emptied by the refuse collection vehicle 102. For example, as described in further detail herein, images captured by camera 134 can be used to position vehicle 102 to engage a refuse container proximate the vehicle 102.

Images and/or video captured by camera(s) 134 are provided to a graphical display 120 for display on a graphical display 120. As shown in FIG. 1B, the graphical display 120 is placed within the cab of vehicle 102 such that the images and/or video can be viewed on the graphical display 120 by an operator of the vehicle 102. As depicted in FIG. 1B, in some implementations, the graphical display includes a screen 122, and images and/or video can be viewed by an operator 150 of the vehicle 102 on the screen 122. In some implementations, the display 120 is a heads-up display that projects images and/or video onto the windshield of the vehicle 102 for viewing by the operator 150. In some implementations, the images and/or video captured by the camera(s) 134 can be communicated to a graphical display 120 of an onboard computing device in the vehicle 102 (e.g., onboard computing device 112 of FIG. 1A). Images and/or video captured by the camera(s) 134 can be communicated to the graphical display 120, over a wired connection (e.g., an internal bus) and/or over a wireless connection. In some implementations, a J1939 bus connects the camera(s) 134 with the onboard computing device.

Vehicle 102 includes one or more switches 108, 118, 148, 158 for operation of the vehicle. For example, vehicle 102 includes a single switch 108 that, when engaged, initiates a dump cycle, as described in further detail herein. In some implementations, a switch 118 is provided to position the lift arm 104(1) and fork mechanism 104(2) in a stowed position for travel. In some implementations, a switch 148 is provided to reposition the lift arm 104(1) and fork mechanism 104(2) to a starting or initial position to conduct a dump cycle (e.g., a "reset" switch). In some implementations, a switch 158 is provided to cause the fork mechanism 104(2) to rotate in order to shake or rotate a refuse container engaged by the fork mechanism 104(2) during a dump cycle to ensure complete dumping of the refuse contained in the refuse container into the vehicle 102. In some implementations, a switch (e.g., switch 508 of FIG. 5) is provided that, when engaged, initiates a compaction cycle to compact the content of the body, as described in further detail herein.

In some implementations, the one or more switches 108, 118, 148, 158 may be incorporated into the various body components. For example, the switches 108, 118, 148, 158 can be incorporated into a dashboard of the cab of the vehicle 102. In some implementations, the switches 108, 118, 148, 158 can be incorporated into a joystick located in the cab of the vehicle 102. In some implementations, one or more of the switches 108, 118, 148, 158 are incorporated into one or more respective foot pedals that an operator 150 of the vehicle 102 can engage by depressing with his or her foot. Alternatively, the one or more switches 108, 118, 148, 158 may be separate from the body components. For example, any of switches 108, 118, 148, 158 may be incorporated in a remote that is detachable from the vehicle 102. In some implementations, at least one of switches 108, 118, 148, 158 is located outside of the vehicle 102 and communicably coupled to the vehicle 102 such that a remote operator can engage a switch 108, 118, 148, 158 to remotely initiate a cycle to be performed by the vehicle 102.

Figure 1C:
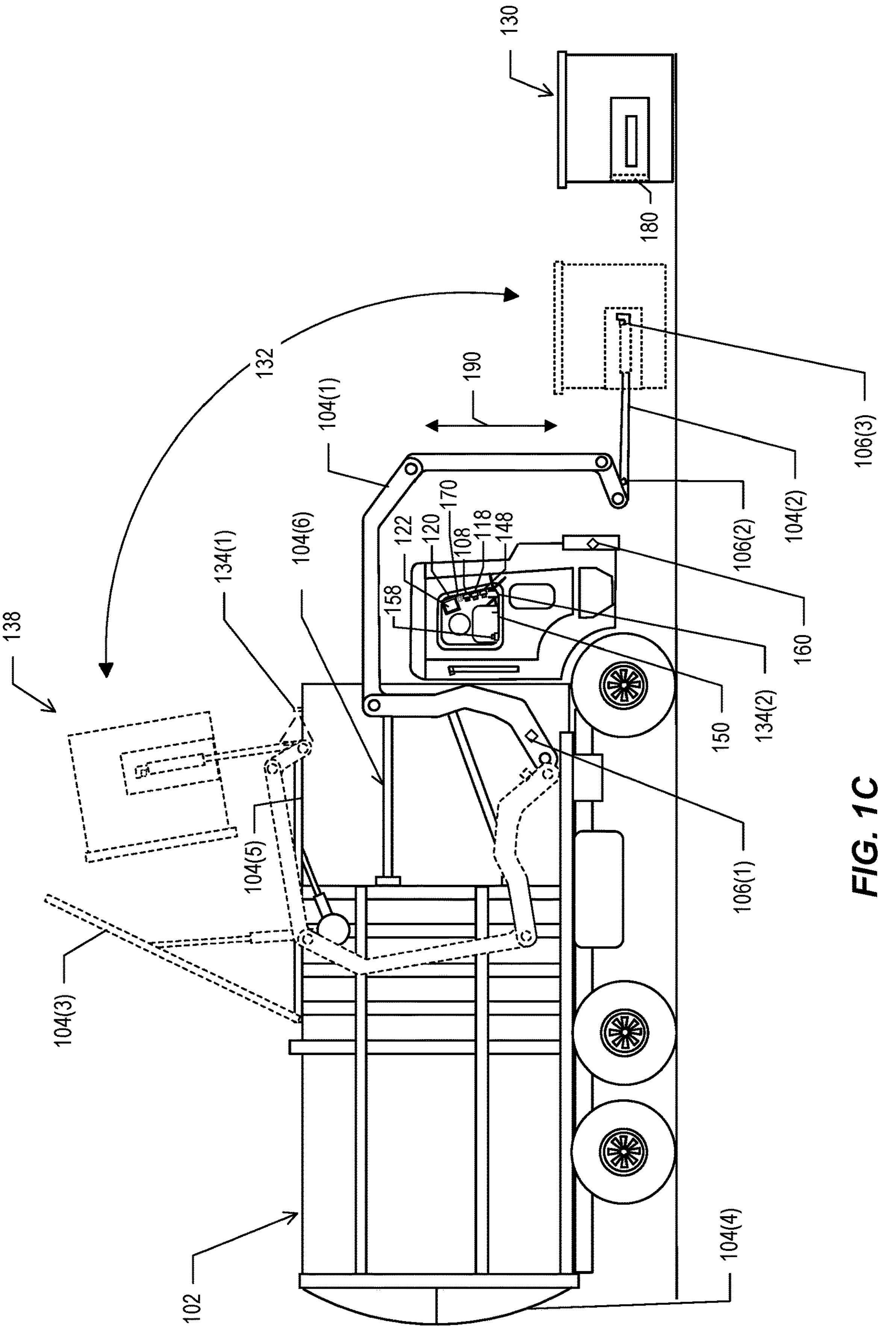
FIG. 1C depicts an exemplary front-loader refuse collection vehicle 102 performing a dump cycle.

FIG. 1C depicts an exemplary front-loader refuse collection vehicle performing a dump cycle.

To perform a dump cycle, a vehicle operator 150 positions the vehicle 102 with respect to a refuse container 130 to be emptied. In some implementations, positioning the vehicle 102 with respect to the refuse container 130 involves positioning the vehicle 102 such that the one or more container detection sensors 106(2). 106(3) on the vehicle 102 are positioned to detect the container 130. For example, vehicle operator 150 positions the vehicle 102 to continually approach a refuse container 130 with the front of the vehicle 102 until container detection sensor(s) 106(2), 106(3) detect that the container is fully engaged by fork mechanism 104(2). In some implementations, vehicle operator 150 positions the vehicle 102 to continually approach a refuse container 130 with the front of the vehicle 102 until container detection sensor(s) 106(2), 106(3) detect a detection zone 180 of the container 130. In some implementations, the detection zone 180 is a region on a front surface of the container 130 that correlates with the position of fork pockets located on adjacent side surfaces of the container 130. In some implementations, one or more container detection sensors 106(2), 106(3) are located on a fork cross shaft of the fork mechanism 104(2) to detect that both of the forks of the fork mechanism 104(2) are in one or more respective pockets of a refuse container 130. U.S. Patent Application No. 62/837,595 filed Apr. 23, 2019 discloses systems and methods for detecting the position of fork pockets located on a refuse container. The entire content of U.S. Patent Application No. 62/837,595 is incorporated by reference herein.

As previously discussed, multiple container detection sensors 106(2), 106(3) can be provided to allow for redundancy and ensure that the vehicle 102 fully engages the refuse container 130. For example, redundancy of container detection sensors 106(2), 106(3) ensures the vehicle 102 has fully engaged a container 130 prior to initiation of a dump cycle, even if a single container detection sensor 106(2), 106(3) fails or malfunctions.

In some implementations, a computing device 112 stores data received from one or more sensors 106 regarding the lift arm 104(1) and fork mechanism 104(2) position when the can detection sensors 106(2), 106(3) detect that the container 130 is engaged for use later vehicle position, as discussed in further detail herein.

In some implementations, a light 170 within the vehicle 102 indicates that the container 130 is detected by the can detection sensors 106(2), 106(3). For example, light 170 illuminates when the container 130 is detected by at least two of the can detection sensors 106(2), 106(3).

Container detection sensor 106(2), 106(3) can include, but are not limited to, a mechanical plunger, a contact sensor, an analog sensor, a digital sensor, a CAN bus sensor, a RADAR sensor, a LIDAR sensor, an ultrasonic sensor, a camera, or a combination thereof. For example, container detection sensors 106(2), 106(3) can include a mechanical plunger and positioning the vehicle 102 requires vehicle operator 150 to position the vehicle 102 such that container 130 contacts and engages container detection sensor 106(2), 106(3).

Positioning the vehicle 102 can also include positioning the vehicle 102 within a threshold distance (e.g., within 10-15 feet) of a known location of a container to be engaged. Location of the vehicle can be based at least partly on information received from the vehicle's onboard systems, such as a GPS receiver and/or telematics sensor(s) describing the current speed, orientation, and/or location of the vehicle at one or more times. In such instances, the onboard computing device 112 can include location sensor device(s) 106, such as GPS receivers, CAN bus sensors, or other types of sensors that enable location determination. The location sensor(s) can generate location data 110 that describes a current location of the vehicle 102 at one or more times. The location data can then be compared to a data set of known container locations to determine an initial position for the vehicle.

The location sensor(s) can generate location data that describes a prior known location of a refuse container to be engaged by the vehicle 102. For example, each time a dump cycle is completed by the vehicle 102 and a refuse container 130 is lowered, the GPS location of the vehicle 102 can be detected by one or more location sensors, and the position of the lift arm 104(1) and fork mechanism 104(2) at the moment the container is fully lowered by the lift arm 104(1) and fork mechanism 104(2) following a dump cycle 132 can be detected by one or more sensors 106. In some examples, the position of the lift arm 104(1) and the position of the fork mechanism 104(2) are determined by sensors 106 located in cylinders of the lift arm 104(1) and fork mechanism 104(2), respectively. The sensor data regarding the vehicle 102 location position, the lift arm 104(1) position, and the fork mechanism 104(2) position can be recorded and stored by the computing device. Whenever a location sensor on the vehicle 102 detects that the vehicle 102 is at, or within a threshold distance of, a previously determined and stored location of a container 130 to be emptied, the lift arm 104(1) and the fork mechanism 104(2) can be automatically positioned into the previously stored arm and grabber mechanism positions associated with the vehicle's current GPS location in order to align the vehicle 102 for engaging the container 130. In some implementations, the vehicle position 102 and the position of the lift arm 104(1) and of the fork mechanism 104(2) are adjusted based on feedback received from one or more can detection sensors 106(2), 106(3).

In some implementations, the vehicle 102 is positioned based on data received from one or more optical sensors 106. For example, one or more optical sensors 106 can provide data to a computing device (e.g. computing device 112), and based on the data received from the one or more optical sensors 106, the computing device can send a signal to the vehicle 102 to automatically adjust the position of the vehicle 102 in order to position the vehicle 102 to engage a refuse container 130 detected by the one or more optical sensors 106. The one or more optical sensors 106 can include, but are not limited to, an analog sensor, a digital sensor, a CAN bus sensor, a RADAR sensor, a LIDAR sensor, an ultrasonic sensor, a camera, or a combination thereof.

Vehicle operator 150 manually engages a switch 108 to initiate a dump cycle. For example, vehicle operator 150 can manually engage switch 108 to initiate a dump cycle in response to positioning the vehicle 102 with respect to a refuse container 130 to be emptied. In some implementations the switch is energized, and may be engaged by operator 150, when at one or more container detection sensors 106(2), 106(3) detect a refuse container 130. For example, switch 108 is energized when at least two of container detection sensors 106(2), 106(3) detect the presence of container 130. In some implementations, a light 170 in the vehicle 102 indicates that the switch 108 is energized. For example, a ring of light-emitting diode (LED) lights surrounding switch 108 illuminate or changes color to indicate that switch 108 is energized.

Switches 108, 118, 148, 158 can include, but are not limited to, push buttons. In some implementations, switches 108, 118, 148, 158 are provided as spring-loaded, momentary contact buttons. In some implementations, switches 108, 118, 148, 158 are provided as potted and sealed LED illuminated push buttons with finger guards. For example, manually engaging switch 108 can include pressing and holding switch 108 throughout the dump cycle. In some implementations, switches 108, 118, 148, 158 are provided as foot pedals positioned on the floorboard of the vehicle 102, and manually engaging the switches 108, 118, 148, 158 includes the operator depressing the pedal incorporating the respective switch 108, 118, 148, 158 with his or her foot.

In some implementations, whenever a container is detected by at least one of container detection sensors 106(2), 106(3), a second switch is disabled. For example, whenever a container is detected by one or more container detection sensors 106(2), 106(3), a second switch 118 for positioning the lift arm 104(1) and the fork mechanism 104(2) in a "stow position" for travel is disabled. In some implementations, a light 170 in the vehicle 102 indicates that the second switch 118 is disabled. For example, a ring of LED lights surrounding the second switch 118 changes color to indicate that the second switch 118 is disabled.

Manual engagement of switch 108 by vehicle operator 150 initiates the dump cycle 132. In some implementations, if a sensor 106 detects that the vehicle 102 is in a neutral position when the dump cycle 132 is initiated, then the computing device 112 sends a signal to the chassis of the vehicle 102 to advance a throttle until the engine of the vehicle 102 reaches a predetermined rotations per minute. In some implementations, if a sensor 106 detects that the vehicle 102 is not in a neutral position when the dump cycle 132 is initiated, the dump cycle 132 is performed while the vehicle 102 is idling.

The dump cycle 132 includes engaging the refuse container 130 with a portion of the vehicle 102. For example, container 130 is engaged by the fork mechanism 104(2) of the front loader vehicle 102. Engaging the refuse container 130 includes extending lift arm 104(1) of the vehicle 102 outward from the vehicle until the container 130 is detected by one or more of the container detection sensors 106(2), 106(3). In some instance, engaging the refuse container 130 includes inserting one or more forks of fork mechanism 104(2) into one or more respective fork pockets located on the container 130. Insertion of one or more forks of fork mechanism 104(2) into one or more respective fork pockets located on the container 130 can be detected by one or more container detection sensors 106(2), 106(3) located on a fork cross shaft of the fork mechanism 104(2).

The dump cycle 132 further includes lifting the engaged refuse container to a dump position. For example, lift arm 104(1) lifts the container 130 engaged by fork mechanism 104(2) to a dump position 138. In some implementations, the dump position 138 is located at a predetermined lift arm 104(1) angle relative to the ground, or the surface that the vehicle 102 is located on during a dump cycle. The predetermined lift arm 104(1) angle of the dump position can be determined based on data provided by sensor 106(1) regarding the lift arm 104(1) angle. For example, dump position 138 is reached when the lift arm 104(1) is at an angle of 74 degrees relative to the ground, or to the surface on which the vehicle 102 is located during a dump cycle.

In some implementations, lifting the engaged container 130 to dump position 138 includes leveling the refuse container 130 to prevent premature dumping of the contents of the container 130. For example, lift arm 104(1) lifts the engaged container 130 to a position in which the fork mechanism 104(2) and the bottom of the container 130 are even with the top of the windshield of the vehicle 102 ("top-of the windshield" position) and levels the container at the "top-of-windshield position." The lift arms 104(1) gradually decelerate the lifting of the engaged container 130 when approaching the "top-of-windshield" position and stop the lifting movement when the fork mechanism 104(2) and the bottom of container 130 reach the "top-of-windshield" position. Once the engaged container has reached the "top-of-windshield" position and lifting of the container has been stopped, forks of the fork mechanism 104(2) level the container.

In some implementations, the refuse container 130 can be leveled when the container is lifted to a height within a predetermined leveling range 190. In some implementations, the leveling range 190 can be provided and adjusted by an operator 150 of the vehicle 102. For example, operator 150 can set the leveling range 190 using an interface in the cab of the vehicle.

In some implementations, continuous leveling of the container can be provided while the engaged container is being lifted to the dump position 138. For example, forks of the fork mechanism 104(2) can continuously level the engaged container as the lift arm 104(1) lifts the container to the dump position 138.

In some implementations, the engaged container 130 is leveled relative to the terrain that the vehicle 102 is positioned on during the dump cycle. In some implementations, an inclinometer located within the vehicle is used to determine adjustments necessary to level the refuse container 130 relative to the terrain that the vehicle 102 is positioned on during the dump cycle.

The dump cycle 132 further includes moving the refuse container to release the contents of the refuse container into a hopper of the refuse collection vehicle. For example, upon lifting refuse container 130 to the dump position 138, the container 130 is moved by rolling the forks of the fork mechanism 104(2) to a predetermined angle, which raises and lowers the container 130. The predetermined angle can be configured by a vehicle operator 150. In some implementations, the predetermined angle is 25 degrees outward from a fully tucked position.

In some implementations, forks of the fork mechanism 104(2) are rolled between an initial angle ("fork clear" position) and the predetermined angle several times to ensure the contents of the container 130 are completely emptied. In some implementations, there is a predetermined delay between each time the container 130 is moved by the fork mechanism 104(2). In some instances, the delay is configurable by vehicle operator 150. For example, a vehicle operator 150 may provide the length of the predetermined delay using an interface in the cab of the vehicle 102. In some implementations, the delay is in a range between 1 and 10 seconds. In some implementations, the predetermined delay is three seconds. Introducing a delay between each movement of the refuse container can allow for more complete dumping of the contents of the container into the hopper. In some implementations, a switch 158 can be engaged by the operator 150 in order to cause the fork mechanism 104(2) to move one or more additional times in order to ensure that the contents of the refuse container 130 are released into the vehicle 102. For example, each time switch 158 is engaged, the forks mechanism 104(2) can be cycled between an initial position, a predetermined angle, and back to the initial position to "shake" the container 130.

The dump cycle 132 can include lowering the refuse container 130 to ground or the surface from which the container 130 was lifted. In some instances, in order to safely lower the container 130, the forks of the fork mechanism 104(2) move to a "forks clear" position at which the forks of the fork mechanism 104(2) will not contact the vehicle while lowering the container 130.

In some implementations, the dump cycle 132 includes lowering the refuse container 130 to the same position that the refuse container 130 was in when it was engaged by the refuse collection vehicle 102. For example, the dump cycle 132 includes recording the position of the refuse container 130 at the time the refuse container is engaged ("pick position"), and, after lifting and moving the refuse container 130 to release its contents, lowering the container 130 to the recorded pick position. Lowering the refuse container 130 to the previously recorded pick position reduces the likelihood of causing damage to the refuse container 130 or the vehicle 102 by ensuring that the refuse container 130 is placed in the same position it was located in prior to engagement without application of unnecessary force to the container 130 or placement of the container 130 on uneven surfaces.

In some implementations, the pick position may be determined based the location of the one or more can detection sensors 106(2), 106(3). In some instances, the pick position is determined based on the location of the lift arm 104(1) and fork mechanism 104(2) based on data provided by sensors 106 at the time when the container 130 is engaged by the fork mechanism 104(2).

In some instances, the pick position of a refuse container is determined through a satellite-based navigation system such as the global positioning system (GPS), or through other techniques. In some implementations, the onboard computing device (e.g., onboard computing device 112 of FIG. 1) can include location sensor device(s), such as global positioning system (GPS) receivers, CAN bus sensors, or other types of sensors that enable location determination.

For example, each time a dump cycle is initiated by the vehicle 102 and a refuse container 130 is engaged, the GPS location of the vehicle 102 can be detected by one or more location sensors, and the position of the lift arm 104(1) and fork mechanism 104(2) at the moment of engagement can be detected by one or more sensors 106. In some examples, the position of the lift arm 104(1) and the position of the fork mechanism 104(2) are determined by sensors 106 located in cylinders of the lift arm 104(1) and fork mechanism 104(2), respectively. The sensor data of the vehicle 102 location, the lift arm 104(1) position, and the fork mechanism 104(2) position (i.e. pick position) can be recorded and stored by the computing device 112. Whenever the dump cycle is complete, the lift arm 104(1) and the fork mechanism 104(2) can be automatically positioned into the stored positions in order to lower the container 130 into the pick position.

The dump cycle 132 continues to completion as long as the switch 108 remains manually engaged. For example, vehicle operator 150 presses switch 108 to initiate the dump cycle 132 and continues manually engaging (i.e. holding)

the switch throughout each step of the dump cycle 132. The dump cycle 132 automatically stops upon the vehicle operator 150 disengaging the switch 108. For example, if vehicle operator 150 disengages switch 108 during the dump cycle 132, the dump cycle 132 will automatically stop in its current position and lift arm 104(1) will cease movement.

After stopping the dump cycle 132 by disengaging the switch 108, reengaging the switch 108 causes the dump cycle to continue to completion as long as the switch 108 continues to remain engaged. In some instances, reengaging the switch 108 will cause the dump cycle to continue from the point at which it previously stopped. For example, after operator 150 stops dump cycle 132 by disengaging switch 108, operator can reengage the switch 108 to continue the dump cycle 132 from the point at which it was stopped. In some implementations, the point at which the dump cycle 132 was stopped can be determined by analyzing data provided by the sensors 106, such as arm position sensor 106(1). For example, based on the data received by the onboard computing device 112 from arm position sensor 106(1) regarding the angle of the one or more lift arms 104(1) at the time the switch was disengaged, the onboard computing device can determine the point in the dump cycle 132 at which the cycle 132 was stopped.

In some implementations, after disengaging switch 108, the operator 150 can engage another switch 148 to reposition the lift arms 104(1) and fork mechanism 104(2) to a start position for the dump cycle 132 in order to restart the dump cycle 132. For example, after engaging switch 148, the lift arm 104(1) and the fork mechanism 104(2) are repositioned to a start position for a dump cycle, and the dump cycle 132 can then be restarted by engaging switch 108.

In some instances, the process of moving the lift arm 104(1) and the fork mechanism 104(2) to a start position for a dump cycle 132 automatically stops upon disengaging the switch 148. For example, if vehicle operator 150 disengages the switch 148 during the process of moving the lift arm 104(1) and the fork mechanism 104(2) to a start position, the process will automatically stop in its current position and the lift arm 104(1) and the fork mechanism 104(2) will cease movement.

In some implementations, after stopping the process of moving the lift arm 104(1) and the fork mechanism 104(2) into a start position by disengaging the switch 148, reengaging the switch 148 causes the process to continue to completion as long as the switch 148 continues to remain engaged. In some instances, reengaging the switch 148 will cause the process of moving the lift arm 104(1) and the fork mechanism 104(2) to a start position to continue from the point at which it previously stopped. For example, after operator 150 stops the process of moving the lift arm 104(1) and the fork mechanism 104(2) to a start position by disengaging the switch 148, the operator 150 can reengage the switch 148 to continue the process from the point at which it was stopped. In some implementations, the point at which the process of moving the lift arm 104(1) and the fork mechanism 104(2) into a start position was stopped can be determined by analyzing data provided by the sensors 106, such as position sensor 106(1). For example, based on the data received by the onboard computing device 112 from position sensor 106(1) regarding the angle of the one or more lift arms 104(1) at the time the switch 148 was disengaged, the onboard computing device 112 determines the point at which the process of moving the one or more lift arms 104(1) into a start position was stopped.

In some instances, after completion of a dump cycle, one or more arms of the refuse collection vehicle are positioned in a travel position. For example, lift arms 104(1) and fork mechanism 104(2) of vehicle 102 are placed in a travel position following completion of dump cycle 132. In some implementations, the travel position includes positioning the arms 104(1) at the "top-of-the-windshield" position and position the fork mechanism 104(2) in a fully tucked position.

In some instances, the one or more lift arms 104(1) of the refuse collection vehicle 130 will not move into a travel position if a container is detected by the one or more container detection sensors 106(2), 106(3). In some implementations, the one or more lift arms 104(1) move into a travel position at the end of the dump cycle automatically once a container is no longer detected by the container detection sensors 106(2), 106(3).

In some implementations, the one or more lift arms 104(1) are moved into a travel position based on an operator manually engaging a switch. In some instance, the same switch 108 used to initiate the dump cycle is used to move the one or more lift arms 104(1) into a travel position. In some examples, a separate stow switch 118 is provided for moving the one or more lift arms 104(1) into a travel position. In some implementations, the process of moving the one or more arms into a travel position continues to completion as long as the switch remains manually engaged. For example, vehicle operator 150 presses the switch 118 to initiate the process of moving the lift arms 104(1) and fork mechanism 104(2) to a travel position and continues manually engaging (i.e., holding) the stow switch 118 to complete the process.

In some instances, the process of moving the one or more lift arms 104(1) to a travel position automatically stops upon disengaging the switch 118. For example, if vehicle operator 150 disengages the stow switch 118 during the process of moving the one or more arms to a travel position, the process will automatically stop in its current position and lift arms 104(1) will cease movement.

In some implementations, after stopping the process of moving the one or more lift arms 104(1) into a travel position by disengaging the switch 118, reengaging the switch 118 causes the process to continue to completion as long as the switch 118 continues to remain engaged. In some instances, reengaging the switch 118 will cause the process of moving the one or more arms to a travel position to continue from the point at which it previously stopped. For example, after operator 150 stops the process of moving the one or more arms to a travel position by disengaging the switch 118, the operator 150 can reengage the switch 118 to continue the process from the point at which it was stopped. In some implementations, the point at which the process of moving the one or more lift arms 104(1) into a travel position was stopped can be determined by analyzing data provided by the sensors 106, such as arm position sensor 106(1). For example, based on the data received by the onboard computing device 112 from arm position sensor 106(1) regarding the angle of the one or more lift arms 104(1) at the time the switch 118 was disengaged, the onboard computing device 112 determines the point at which the process of moving the one or more lift arms 104(1) into a travel position was stopped.

Figure 2A:
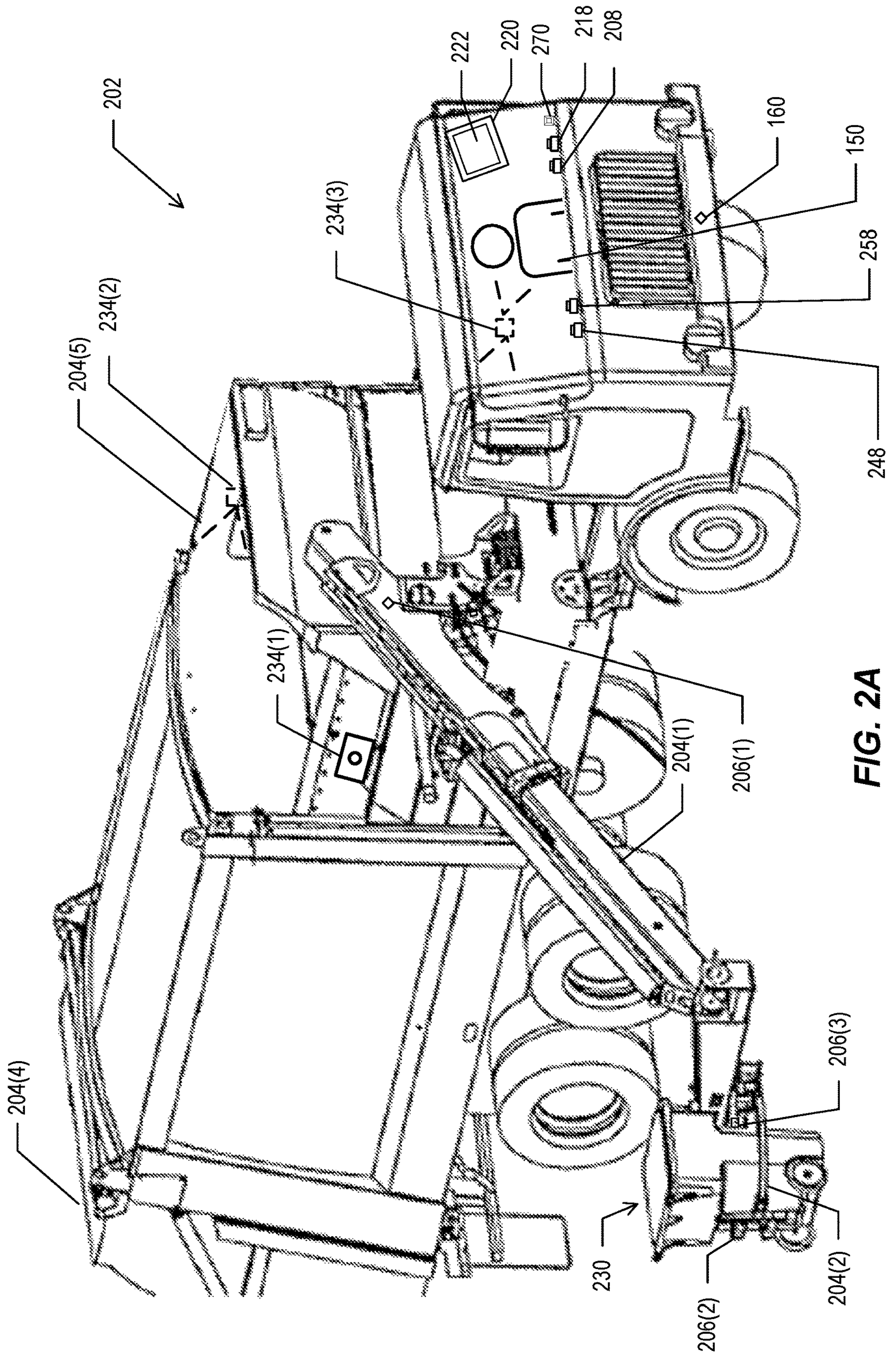
FIG. 2A-2C depict an exemplary side-loader refuse collection vehicle performing a dump cycle.
Figure 2B:
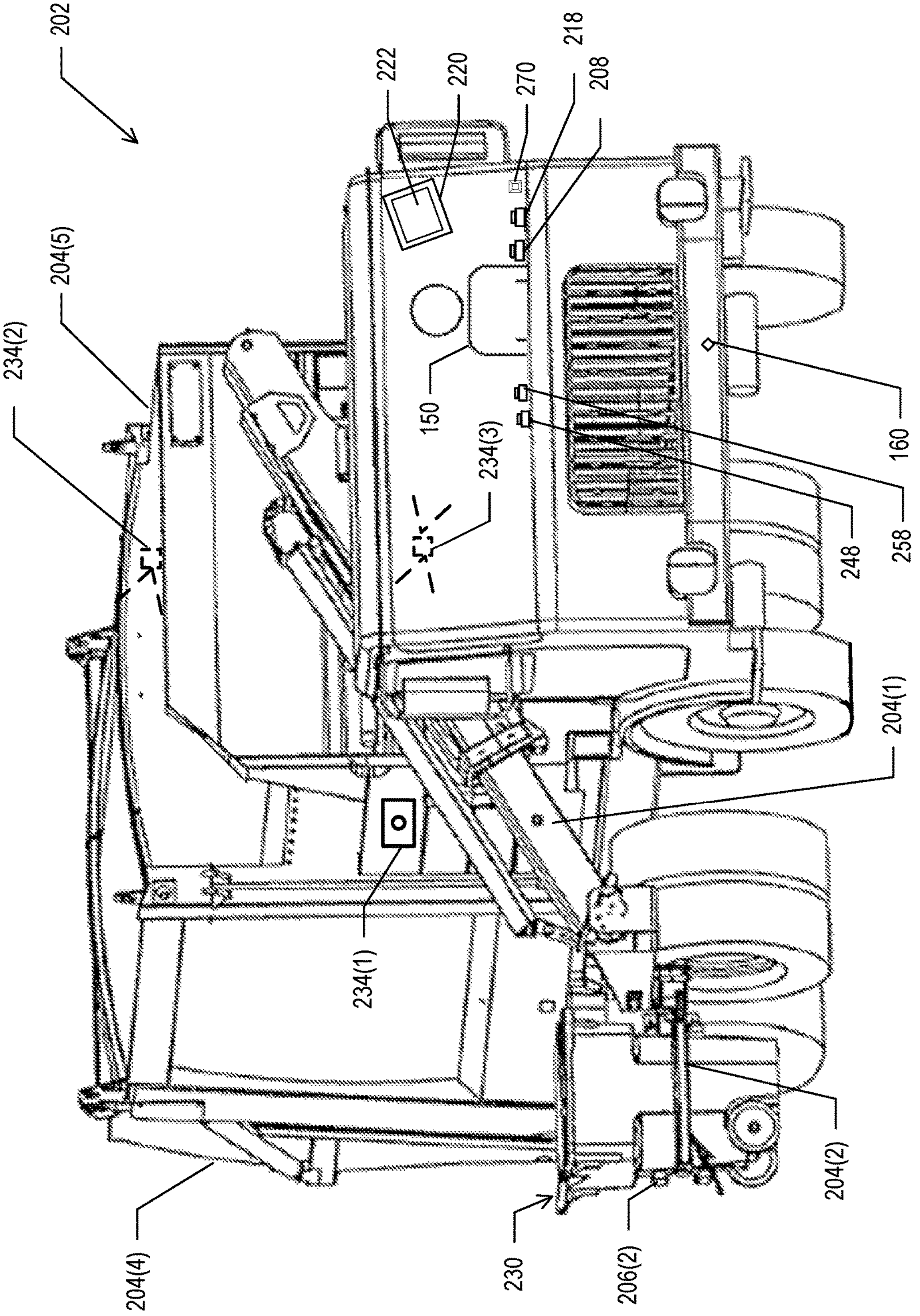
Figure 2C:
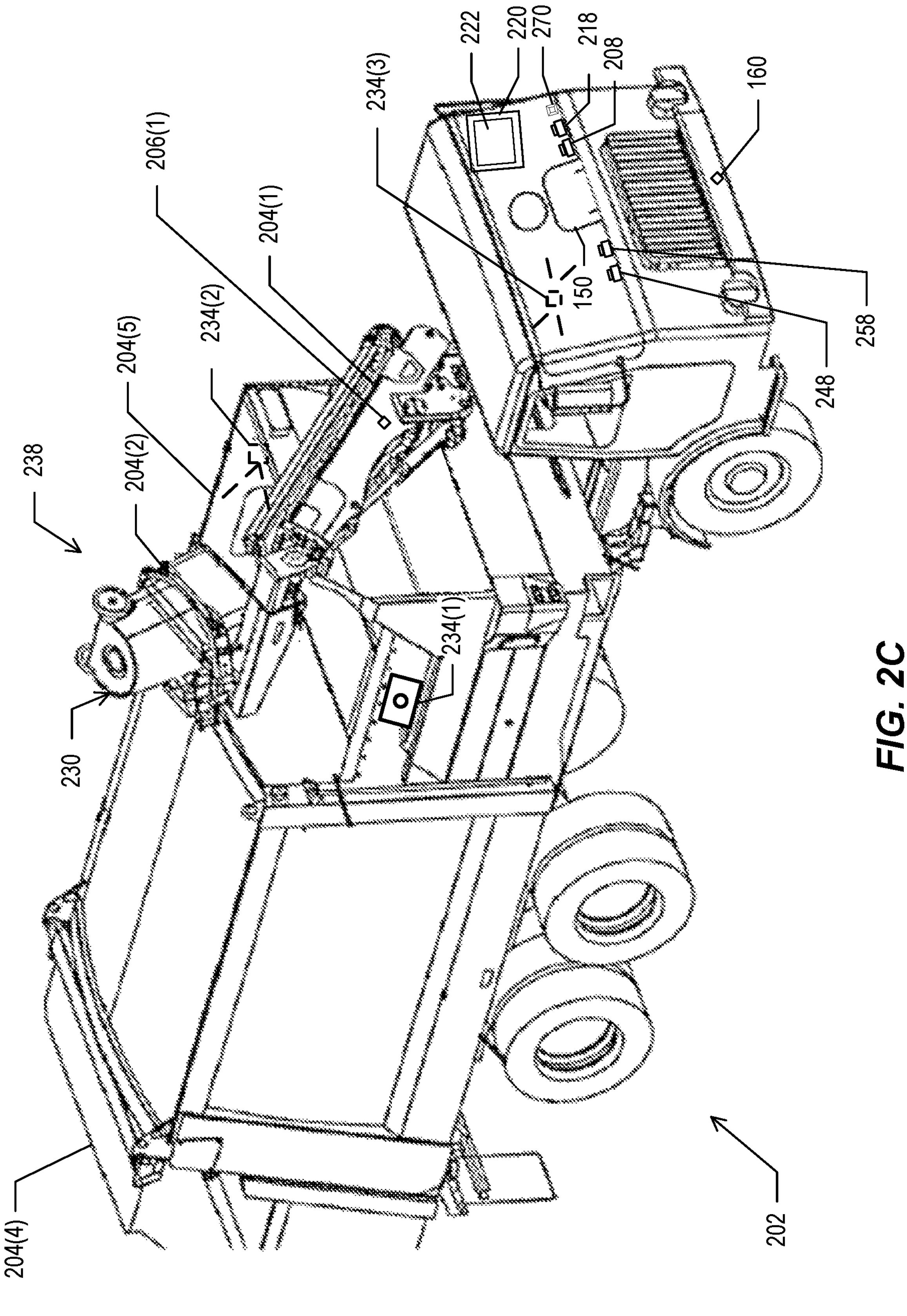

FIGS. 2A-2C depict an exemplary side-loader refuse collection vehicle performing a dump cycle. The side-loader refuse collection vehicle 202 includes various body components 204 including, but not limited to: a lift arm 204(1), a grabber mechanism 204(2), a back gate or tailgate 204(4), and a hopper 204(5) to collect refuse during operation.

One or more sensors 206 are be situated on the vehicle 202 to determine the state and/or detect the operations of the body components 204. In the example shown, the lift arm 204(1) includes an arm position sensor 206(1) that is arranged to detect the position of the lift arm 204(1), such as during its dump cycle of lifting a container 230 and emptying its contents into the hopper 204(5). The sensor data provided by arm position sensor 206(1) can be analyzed to monitor a dump cycle being conducted by the refuse collection vehicle. For example, the arm position sensor 206(1) can provide data about the current position of the lift arm 204(1), which, as described in further detail herein, can be used to determine the current step being conducted in a dump cycle being performed by the vehicle.

In the example shown, container detection sensors 206(2), 206(3) are arranged on the vehicle 202 to detect the presence and position of a refuse container 230. For example, container detection sensors 206(2), 206(3) detect whether a can is fully engaged by the grabber mechanism 204(2). In some implementations, the grabber mechanism 204(2) includes multiple sensors 206. For example, grabber mechanism 204(2) can include one or more container detection sensors 206 located on a left fork of the grabber mechanism 204(2), one or more container detection sensors 206 located on a right fork of the grabber mechanism 204(2), and one or more container detection sensors 206 located on the crossbar between the left and right fork of the grabber mechanism 204(2). Multiple container detection sensors 206 can implemented to provide redundancy in refuse container detection.

Sensors 206 can include, but are not limited to, a mechanical plunger, a contact sensor, an analog sensor, a digital sensor, a CAN bus sensor, a RADAR sensor, a LIDAR sensor, an ultrasonic sensor, a camera, or a combination thereof. In some implementations, the container detection sensors 206(2), 206(3) include one or more analog ultrasonic sensors. In some implementations, the container detection sensors 206(2), 206(3) include one or more mechanical plungers.

The vehicle 202 also includes a one or more cameras 234. In the example shown in FIGS. 2A-2C, a first camera 234(1) is positioned to visualize the environment proximate a side of the vehicle 202, including a refuse container 230 to be engaged by the vehicle 202. The side view camera 234(1) can be aligned with a centerline of the grabber mechanism 204(2). The side view camera 234(1) helps provide the vehicle operator 150 with a clear visual line of sight of a refuse container located to the side of the vehicle 202. This can be particularly useful when the refuse container to be engaged is within close proximity of the vehicle.

In some implementations, the side view camera 234(1) is contained within an enclosure. For example, the camera 234(1) can be contained within a metal enclosure that also includes a light source. Placing the side view camera 234(1) in an enclosure can help protect the camera 234(1) from debris.

In the example shown, a second camera 234(2) is positioned to visualize refuse contained in the vehicle 202 or falling into the vehicle 202, such as refuse in the hopper of the vehicle 202. The camera(s) 234 may also be placed in other positions and/or orientations. The angle of each of the cameras 234 can be adjusted by the vehicle operator 150.

Additionally, vehicle 202 includes one or more cameras 234(3) placed within the cab of the vehicle 202. For example, two cameras 234(3) can be contained within a housing of the inside the vehicle 202, wherein a first camera is oriented to capture images of inside the cab of the vehicle 202 and the second camera is oriented to capture images of the exterior of the vehicle 202 through a windshield of the vehicle 202.

Images and/or video captured by camera(s) 234 are provided to a graphical display 220 for display on the graphical display 220. As shown in FIGS. 2A-2C, the graphical display 220 is placed within the cab of vehicle 202 such that the images and/or video can be viewed on the display 220 by the operator 150 of the vehicle 202. In some implementations, the graphical display includes a screen 222 and images and/or video can be viewed by an operator of the vehicle 102 on the screen 222. In some implementations, the display 120 is a heads-up display that projects images and/or video onto the windshield of the vehicle 102 for viewing by the operator. In some implementations, the images and/or video captured by the camera(s) 234 can be communicated to a graphical display 220 of an onboard computing device in the vehicle 202 (e.g., onboard computing device 121 of FIG. 1A). Images and/or video captured by the camera(s) 234 can be communicated to the graphical display 220, over a wired connection (e.g., an internal bus) and/or over a wireless connection. In some implementations, a J1939 bus connects the camera(s) with the onboard computing device.

Figure 3A:
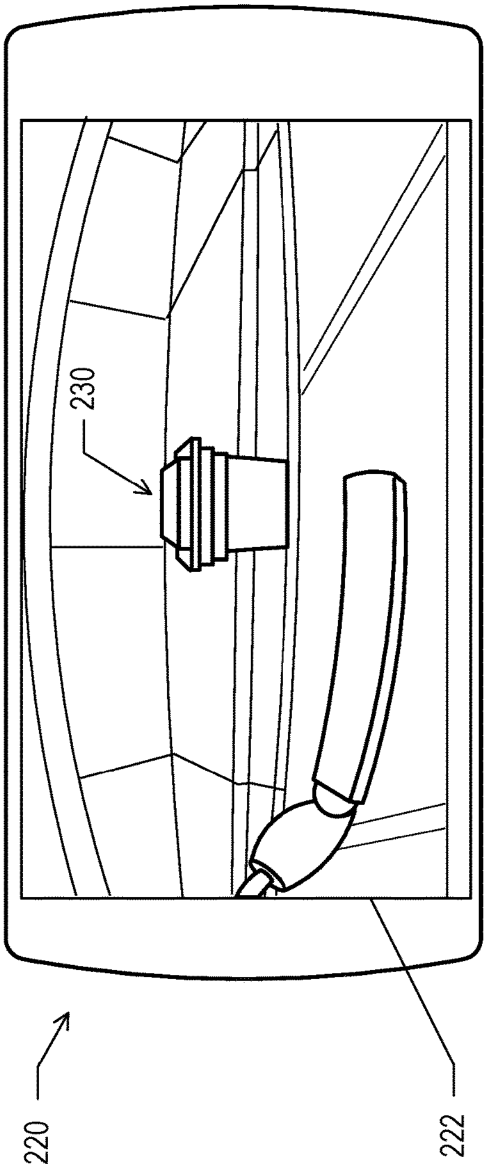
FIGS. 3A, 3B, 4A, and 4B depict example graphical displays of a refuse collection vehicle.
Figure 3B:
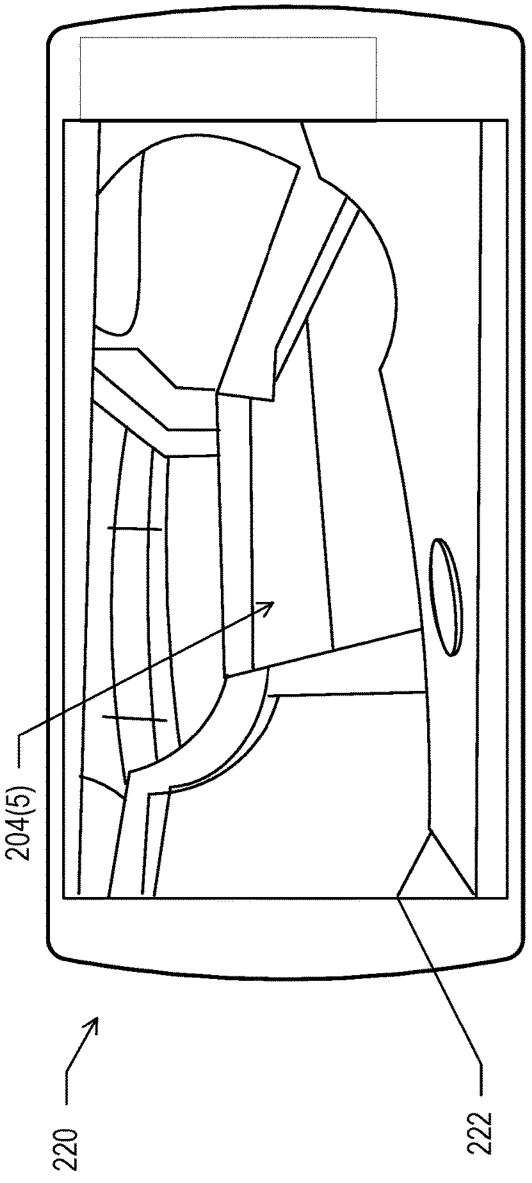

In some implementations, the images and/or video are provided to the graphical display 220 at least in part based on data received from sensors 206. For example, an onboard computing device (e.g., onboard computing device 112 of FIG. 1A) may execute processes that performs an analysis of the data received from the sensors 206 to detect the presence of a triggering condition, such as the lift arm 204(5) being in a particular position in its dump cycle. Upon detecting the triggering condition, the computing device can send a signal to one or more cameras 234 to provide images and/or video captured by the camera to the graphical display 220. For example, sensor 206(1) monitor the angle of lift arm 204(1) during a dump cycle and provide this data to an onboard computing device. Whenever sensor 206(1) detects that the angle of lift arm 204(1) is below a threshold angle, an onboard computing devices sends a signal to camera 234(1) located on the side of the body of vehicle 202 to provide, in real-time, images and/or video to the graphical display 220 captured by the camera 234(1). FIG. 3A depicts an exemplary image of a refuse container 230 provided by camera 234(1) located on the side of vehicle 202 and presented on the graphical display 220. Whenever sensor 206(1) detects that the angle of lift arm 204(1) is above a threshold angle, an onboard computing devices sends a signal to camera 234(2) located on the top of vehicle 202 to provide, in real-time, images and/or video to the graphical display 220 captured by the camera 234(2). FIG. 3B depicts an exemplary image of the inside of a hopper 204(5) of a side-loader vehicle 202 provided by camera 234(2) located on the top of vehicle 202 and presented on the graphical display 220. In some instances, whenever lift arm 204(1) is raised above the threshold angle, the images and/or video being provided to the graphical display 220 for display on graphical display 220 are automatically switched from image(s)/video provided by the side view camera 234(1) to image(s)/video provided by the top view camera 234(2) (i.e. switched from the view depicted in FIG. 3A to the view depicted in FIG. 3B).

Vehicle 202 also includes one or more switches 208, 218, 248, 258 for operation of the vehicle. For example, vehicle 202 includes a single switch 208 that, when engaged, initiates a dump cycle, as described in further detail herein. Vehicle 202 also includes a switch 218 to position the lift arm 204(1) and grabber mechanism 204(2) in a stowed position for travel. In some implementations, a switch (e.g., switch 508 of FIG. 5) can be provided that, when engaged, initiates a compaction cycle to compact the contents of the hopper into the body, as described in further detail herein with reference to FIG. 5. In some implementations, a switch (e.g., switch 518 of FIG. 5) can be provided that, when engaged, initiates an ejection cycle to push the contents of the body out of the vehicle, as described in further detail herein with reference to FIG. 5. In some implementations, a switch 248 is provided to reposition the lift arm 204(1) and grabber mechanism 204(2) to a starting or initial position to conduct a dump cycle (e.g., a "reset" switch). In some implementations, a switch 258 is provided to cause the grabber mechanism 204(2) to rotate in order to shake or rotate a refuse container engaged by the grabber mechanism 204(2) during a dump cycle to ensure complete dumping of the refuse contained in the container into the vehicle 202.

In some implementations, the one or more switches 208, 218, 248, 258 may be incorporated into the various body components. For example, switch 208, 218, 248, 258 can be incorporated into a dashboard of the cab of the vehicle 202. In some implementations, switches 208, 218, 248, 258 can be incorporated into a joystick located in the cab of the vehicle 202. In some implementations, one or more of the switches 208, 218, 248, 258 are incorporated into one or more respective foot pedals that an operator 150 of the vehicle 202 can engage by depressing with his or her foot. Alternatively, the one or more switches 208, 218, 248, 258 may be separate from the body components. For example, any of switches 208, 218, 248, 258 can be incorporated into a remote that is detachable from the vehicle 202. In some implementations, at least one of switches 208, 218, 248, 258 is located outside of the vehicle 202 and communicably coupled to the vehicle 202 such that a remote operator can engage a switch 208, 218, 248, 258 to remotely initiate a cycle to be performed by the vehicle 202.

To perform a dump cycle, a vehicle operator 150 positions the vehicle 202 with respect to a refuse container 230 to be emptied. Positioning the vehicle 202 with respect to the refuse container 230 involves positioning the vehicle 202 such that the grabber mechanism 204(2) is in position to engage the refuse container 230.

In some implementations, positioning the refuse collection vehicle 202 with respect to a refuse container 230 to be emptied includes positioning the vehicle 202 in a fore-aft direction while observing images on a graphical display 220 within the vehicle obtained from a camera directed at the container 230 to align a feature of an image of the container 230 on the graphical display 220 with a visual marker positioned on the graphical display 220. For example, as shown in FIGS. 4, images of a refuse container 230 are captured by side view camera 234(1) and transmitted to graphical display 220 for display to the vehicle operator 150. In some implementations, a video feed of the refuse container 230 is provided by the side view camera 234(1) and transmitted real-time to graphical display 220 for display on the graphical display 220 to the vehicle operator 150.

Figure 4A:
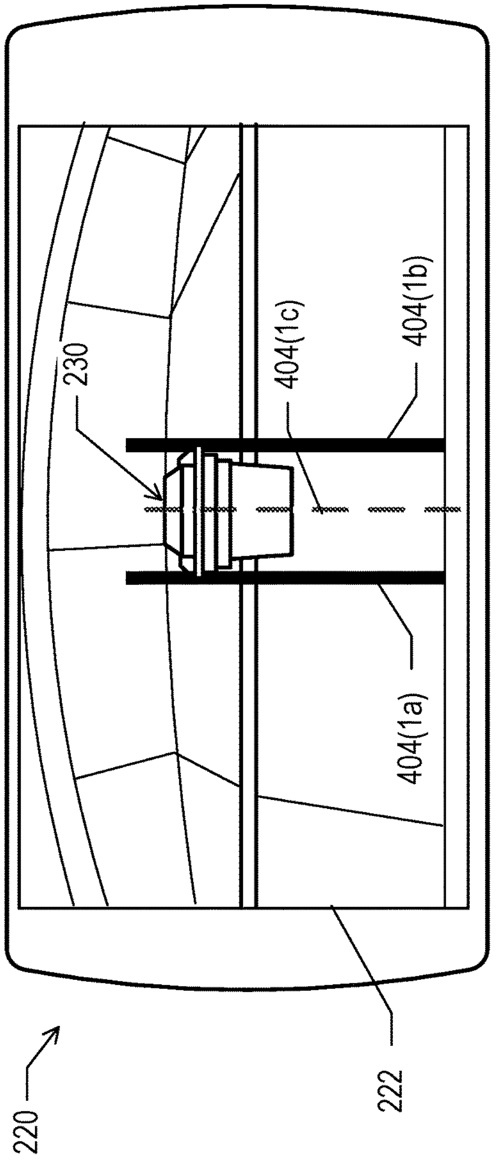

As shown in FIG. 4A, graphical display 220 displays image(s) and/or video of a refuse container 230 to be engaged by vehicle 202 and one or more visual markers 404. In some implementations, the visual markers are two guidelines positioned on the graphical display 220, and positioning the vehicle 202 involves moving the vehicle in a fore-aft direction to fit the image/video of the refuse container 230 between the visual markers 404. For example, as shown in FIG. 4A, positioning the vehicle 202 involves moving the vehicle in fore-aft direction such that the image/video of the refuse container 230 on graphical display 220 is aligned between each of the visual marker guidelines 404(1*a*), 404(1*b*) on graphical display 220.

In some implementations, the visual marker 404 includes a third guideline 404(1*c*) disposed equidistant between the first guideline 404(1*a*) and second guideline 404(1*b*), and positioning the vehicle 202 includes aligning a centerline of the refuse container 230 in the image/video on the graphical display 220 with the third guideline 404(1*c*). The length of the visual marker guidelines 404(1*a*), 404(1*b*), 404(1*c*) on the graphical display 220 represent the furthest distance grabber mechanism 204(2) can reach to pick up a refuse container.

Figure 4B:
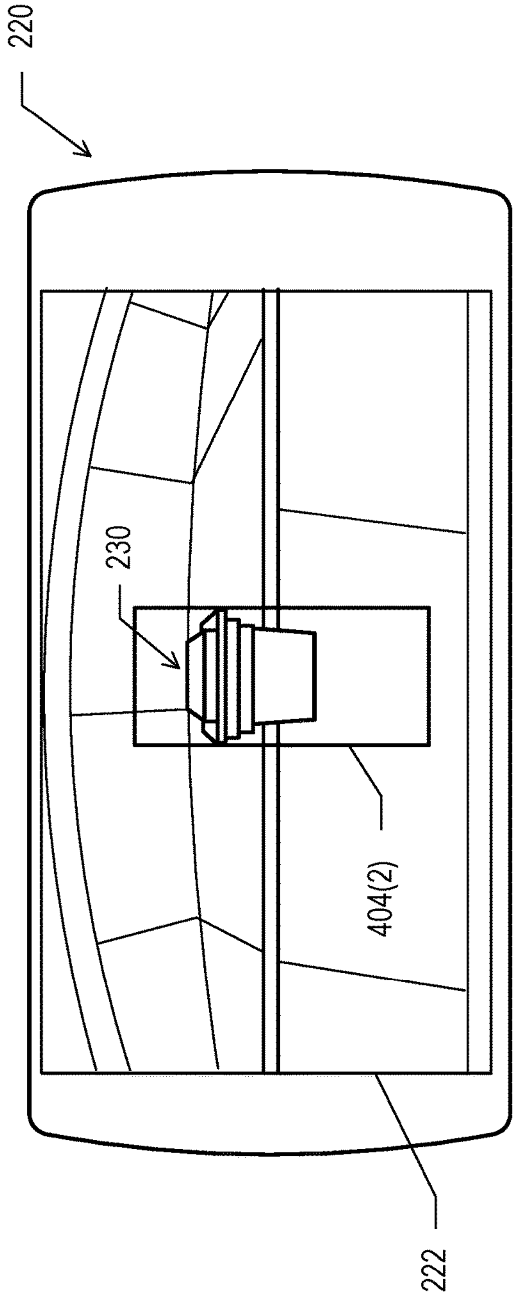

In some implementations, the visual marker 404 is provided as a rectangle that represents the area in which the grabber mechanism of a side-loader vehicle can reach. For example, as depicted in FIG. 4B, visual marker 404 positioned on the graphical display 220 represents the area of reach of lift arm 204(1) and grabber mechanism 204(2) of vehicle 202, and positioning vehicle 202 involves moving the vehicle 202 in the fore-aft direction to position the image/video of refuse container 230 on the graphical display 220 within the visual marker 404(2) on graphical display 220.

In some implementations, the visual marker 404 is adjustable. For example, vehicle operator 150 can adjust the width of visual marker 404(2) or the distance between visual markers 404(1*a*) and 404(1*b*) based on the size of the refuse container 230. Vehicle operator 150 can increase or decrease the distance between visual markers 404(1*a*) and 404(1*b*) such that the distance between the first visual marker guideline 404(1*a*) and the second visual marker guideline 404(1*b*) is greater than or equal to the width of the image of the refuse container 230 on the graphical display 220, as shown in FIG. 4A.

In some implementations, the images captured by one or more cameras 234 of the vehicle are provided to a computing device (such as onboard computing device 112) for processing. For example, the images of the refuse container 230 captured by side view camera 234(1) can be transmitted to a computing device for image processing. In some implementations, a video feed of the refuse container 230 is provided by the side view camera 234(1) and transmitted to a computing device for image processing. In some implementations, a computing device receives the images or video captured by the camera 234(1) and uses machine learning based image processing techniques to determine whether the vehicle 202 is properly positioned to engage the refuse container 230. For example, a computing device can receive an image from camera 234(1), including the previously discussed visual marker 404, and determine, based on machine learning image processing techniques, that the vehicle 202 is properly positioned to engage a container 230 by determining that the image of the container 230 is positioned within the visual marker 404.

In some implementations, the vehicle 202 is automatically positioned to engage a refuse container 230 based on the image captured by a camera 234(1) on the vehicle 202 and processed by a computing device (e.g. computing device 112). For example, a computing device can receive one or more images from camera 234(1), including the visual marker 404 previously discussed, process the image using machine learning based image processing techniques to determine the location of the refuse container 230 in the image relative to the visual marker 404, and, in response, send a signal to the vehicle 202 to automatically adjust the position of the vehicle such that the image of the container 230 is positioned within the visual marker 404. The automatic positioning of the vehicle based on processing the image(s) of the refuse container 230 by a computing device can be conducted automatically without operator involvement. For example, the vehicle can be automatically positioned in a fore-aft direction relative to the container 230 without an operator driving or positioning the vehicle based on signals provided by a computing device configured to process images received from camera 234(1).

In some implementations, a dump cycle is automatically initiated based on a computing device determining that the vehicle is properly positioned to engage a refuse container 230. For example, camera 234(1) can provide one or more images to a computing device of a computing system (e.g. computing device 112) and, as previously discussed, the computing device can use machine learning based image processing techniques to determine that an image of the container 230 is aligned with a visual marker 404, indicating proper vehicle alignment. After determining that the vehicle is properly aligned, the computing device can send a signal to the vehicle 202 to automatically initiate a dump cycle. In some implementations, the computing device sends a signal to energize a switch 208 for initiating the dump cycle in response to determining that the vehicle is properly positioned based on the image processing of an image provided by camera 234(1).

In some implementations, the images captured by the cameras 234(1) of vehicle 202 are provided to a device worn by the operator 150 of the vehicle. For example, the images captured by camera 234(1) can be provided to an electronic glasses device worn by operator 150 such that the images captured by camera 234(1) and the visual marker 404 are displayed for visualization within the glasses worn by the operator 150. The images captured by camera 234(1) and visual markers can also be provided to other virtual reality or augmented reality devices provided to or worn by the operator 150 of the vehicle.

In some implementations, the vehicle 202 is positioned based on data received from one or more optical sensors 206. For example, one or more optical sensors 206 can provide data to a computing device (e.g. computing device 112), and based on the data received from the one or more optical sensors 206, the computing device can send a signal to the vehicle 202 to automatically adjust the position of the vehicle 202 in order to position the vehicle 202 to engage a refuse container 230 detected by the one or more optical sensors 206. The one or more optical sensors 206 can include, but are not limited to, an analog sensor, a digital sensor, a CAN bus sensor, a RADAR sensor, a LIDAR sensor, an ultrasonic sensor, a camera, or a combination thereof.

Positioning the vehicle 202 can also include positioning the vehicle 202 within a threshold distance (e.g., within 10-15 feet) of a known location of a container to be engaged. The location of the vehicle 202 can be based at least partly on information received from the vehicle's onboard systems, such as a GPS receiver and/or telematics sensor(s) describing the current speed, orientation, and/or location of the vehicle at one or more times. In such instances, an onboard computing device (e.g., onboard computing device 112 of FIG. 1A) can include location sensor device(s), such as GPS receivers, CAN bus sensors, or other types of sensors that enable location determination. The location sensor(s) can generate location data that describes a current location of the vehicle 202 at one or more times. The location data can then be compared to a data set of known container locations to determine an accurate positioning with greater confidence that through the use of the sensor data alone.

In some implementations, positioning the vehicle 202 includes positioning the vehicle 102 within a threshold distance (e.g., within 10-15 feet) of a known location of a container to be engaged. Location of the vehicle 202 can be based at least partly on information received from the vehicle's onboard systems, such as a GPS receiver and/or telematics sensor(s) describing the current speed, orientation, and/or location of the vehicle at one or more times. In such instances, the onboard computing device can include location sensor device(s) 206, such as GPS receivers, CAN bus sensors, or other types of sensors that enable location determination. The location sensor(s) can generate location data that describes a current location of the vehicle 202 at one or more times. The location data can then be compared to a data set of known container locations to determine an initial position for the vehicle.

The location sensor(s) can generate location data that describes a prior known location of a refuse container to be engaged by the vehicle 202. For example, each time a dump cycle is completed by the vehicle 202 and a refuse container 230 is lowered, the GPS location of the vehicle 202 can be detected by one or more location sensors, and the position of the lift arm 204(1) and grabber mechanism 204(2) after the container is fully lowered by the lift arm 204(1) and the grabber mechanism 204(2) following a dump cycle can be detected by one or more sensors 206. In some examples, the position of the lift arm 204(1) and the position of the grabber mechanism 204(2) are determined by sensors 206 located in cylinders of the lift arm 204(1) and grabber mechanism 204(2), respectively. The sensor data regarding the vehicle 202 location position, the lift arm 204(1) position, and the grabber mechanism 204(2) position can be recorded and stored by the computing device. Whenever a location sensor on the vehicle 202 detects that the vehicle 202 is at, or within a threshold distance of, a previously determined and stored location of a container 230 to be emptied, the lift arm 204(1) and the grabber mechanism 204(2) can be automatically positioned into the previously stored arm and grabber mechanism positions associated with the vehicle's current GPS location in order to align the vehicle 202 for engaging the container 230. In some implementations, the vehicle position 202 and the position of the lift arm 204(1) and of the grabber mechanism 204(2) are adjusted based on feedback received from one or more can detection sensors 206(2), 206(3).

In some implementations, vehicle operator 150 manually engages a switch 208 to initiate a dump cycle. In some implementations, vehicle operator 150 manually engages switch 208 to initiate a dump cycle in response to positioning the vehicle 202 with respect to a refuse container 230 to be emptied. Switches 208, 218, 248, 258 can include, but are not limited to, push buttons. In some implementation, switches 208, 218, 248, 258 are provided as a spring-loaded, momentary contact buttons. In some implementations, switches 208, 218, 248, 258 are provided as potted and sealed LED illuminated push buttons with finger guards. For example, manually engaging switch 208 can include pressing and holding switch 208 throughout the dump cycle. In some implementations, switches 208, 218, 248, 258 are provided as foot pedals positioned on the floorboard of vehicle 202, and manually engaging the switches 208, 218, 248, 258 includes the operator 150 depressing the pedal incorporating the respective switch 208, 218, 248, 258 with his or her foot.

In some implementations, if a sensor 206 detects that the vehicle 202 is in a neutral position when the dump cycle is initiated, then the computing device of the vehicle 202 sends a signal to the chassis of the vehicle 202 to advance a throttle until the engine of the vehicle 202 reaches a predetermined rotations per minute. In some implementations, if a sensor 206 detects that the vehicle 202 is not in a neutral position when the dump cycle is initiated, the dump cycle is performed while the vehicle 202 is idling.

In some implementations, the dump cycle includes engaging the refuse container 230 with a portion of the vehicle 202. For example, container 230 is engaged by the grabber mechanism 204(2) of the side loader vehicle 202. As depicted in FIG. 2A, engaging the refuse container 230 includes extending lift arm 204(1) of the vehicle 202 outward from the side of the vehicle 202 until the container 230 is detected by one or more of the container detection sensors 206(2), 206(3). In some implementations, a light 270 within the vehicle 202 indicates that the container 230 is detected by the can detection sensors 206(2), 206(3). For example, light 270 illuminates when the container 230 is detected by at least two of the can detection sensors 206(2), 206(3).

In some implementations, upon detecting the refuse container 230, one or more grippers of the arm move toward the container. For example, the grippers of the grabber mechanism 204(2) of lift arm 204(1) begin moving toward the refuse container 230 in response to lift arm 204(1) extending outward and one or more container detection sensors 206(2), 206(3) detecting the refuse container 230. In some implementations, one or more grippers continue to move toward the refuse container until a threshold pressure is applied to the refuse container. For example, the gripper arms of grabber mechanism 204(2) continue to move inward toward the refuse container 230 until a threshold pressure on refuse container 230 is detected by one or more container detection sensors 206(2), 206(3). In some implementations, the threshold pressure may be adjustable by an operator 150 of the vehicle by an interface located in the cab of the vehicle. In some implementations, grippers of grabber mechanism 204(2) continue to move toward refuse container 230 until both a threshold pressure and a specified position of the grippers is achieved.

In some implementations, whenever a container is detected by at least one of container detection sensors 206(2), 206(3), a second switch is disabled. For example, whenever a container is detected by at least one of container detection sensor 206(2), 206(3), a switch 218 for positioning the lift arm 204(1) and the grabber mechanism 204(2) into a "stow position" for travel is disabled. In some implementations, a light 270 in the vehicle 202 indicates that the second switch 218 is disabled. For example, a ring of LED lights surrounding the second switch 218 changes color to indicate that the second switch 218 is disabled.

The dump cycle can further include lifting the engaged refuse container to a dump position. For example, as depicted in FIGS. 2B and 2C, lift arm 204(1) lifts the container 230 engaged by grabber mechanism 204(2) to a dump position 238.

In some implementations, lifting the engaged container to a dump position 238 includes leveling the refuse container 230 to prevent premature dumping of the contents of the container 230. In some implementations, continuous leveling of the container can be provided while the engaged container 230 is being lifted to the dump position 238. For example, the grabber mechanism 204(2) continuously levels the engaged container 230 as the lift arm 204(1) lifts the container to the dump position 238. In some implementations, the engaged container 230 is leveled relative to the terrain that the vehicle 202 is positioned on during the dump cycle. In some implementations, a sensor 206(1) on the rotary actuator of grabber mechanism 204(2), such as an inclinometer, provides data to an onboard computing device (e.g., onboard computing device 112 of FIG. 1A) that analyzes the sensor data to determine adjustments necessary to level the engaged refuse container 230. A rotary actuator of grabber mechanism 204(2) can be adjusted to level the engaged container 230 while lifting the container to a dump position.

The dump cycle can further include moving the refuse container to release the contents of the refuse container into a hopper of the refuse collection vehicle. In some implementations, moving the refuse container to release the contents of the refuse container into a hopper of the refuse collection vehicle includes pivoting the refuse container one or more times to dump the contents to a specified location in the hopper of refuse collection vehicle. For example, upon lifting refuse container 230 to the dump position 238, a rotary actuator of grabber mechanism 204(2) pivots the engaged container 230 one or more times to dump the contents of the container into the hopper 204(5). In some implementations, there is a predetermined delay between each time the container 230 is pivoted by the grabber mechanism 204(2). In some instances, the delay is configurable by vehicle operator 150. For example, a vehicle operator 150 may provide the length of the predetermined delay using an interface in the cab of the vehicle 202. In some implementations, the delay between pivots is in a range between 1 and 10 seconds. In some implementations, the predetermined delay between pivots is three seconds. Introducing a delay between each pivot of the refuse container can allow for more complete dumping of the contents of the container into the hopper. In some implementations, a switch 258 can be engaged by the operator 150 in order to cause the rotary actuator of grabber mechanism 204(2) to pivot an additional time to ensure that the contents of the refuse container 230 are released into the vehicle 202.

The dump cycle can also include lowering the refuse container to ground, or lowering the refuse container to the surface from which the container was lifted. In some implementations, the dump cycle includes lowering the refuse container to the position that the refuse container was at when it was engaged by the refuse collection vehicle (i.e. the "pick position"). For example, the dump cycle can include recording the position of the refuse container 230 at the time the refuse container is engaged ("pick position"), and, after lifting and moving the refuse container 230 to release its contents, lowering the container 230 to the recorded pick position.

As previously discussed, in some instances, the pick position of a refuse container is determined through a satellite-based navigation system such as a global positioning system (GPS), or through other techniques. In some implementations, the onboard computing device (e.g., onboard computing device 121 of FIG. 1A) can include one or more location sensor device(s), such as global positioning system (GPS) receivers, CAN bus sensors, or other types of sensors that enable location determination. The location sensor(s) can generate location data that describes a current location of a refuse container 230 to be engaged by the vehicle 202. In some implementations, the pick position is determined based on the location of the one or more can detection sensors 206(2), 206(3) at the time the container 230 is engaged by vehicle 202. In some instances, the pick position is determined based on the location of the lift arm

204(1) and grabber mechanism 204(2), as determined by the sensors 206, when the container is engaged by the grabber mechanism 204(2).

For example, each time a dump cycle is initiated by the vehicle 102 and a refuse container 230 is engaged, the GPS location of the vehicle 202 can be detected by one or more location sensors, and the position of the lift arm 204(1) and grabber mechanism 204(2) at the moment of engagement can be detected by one or more sensors 206. In some examples, the position of the lift arm 204(1) and the position of the grabber mechanism 204(2) are determined by sensors 206 located in cylinders of the lift arm 204(1) and grabber mechanism 204(2), respectively. The sensor data of the vehicle 202 location, the lift arm 204(1) position, and the grabber mechanism 204(2) position (i.e. pick position) can be recorded and stored by the computing device. Whenever the dump cycle is complete, the lift arm 204(1) and the grabber mechanism 204(2) can be automatically positioned into the previously stored positions in order to lower the container 230 into the pick position.

In some implementations, the dump cycle continues to completion as long as the switch 208 remains manually engaged. For example, vehicle operator 150 presses the switch 208 to initiate the dump cycle and continues manually engaging (i.e. holding) the switch 208 throughout each step of the dump cycle to complete the dump cycle. In some instances, the dump cycle automatically stops upon disengaging the switch 208. For example, if vehicle operator 150 disengages switch 208 during the dump cycle, the dump cycle will automatically stop in its current position and lift arm 204(1) will cease movement.

In some implementations, after stopping the dump cycle by disengaging the switch, reengaging the switch 208 causes the dump cycle to continue to completion as long as the switch 208 continues to remain engaged. In some instances, reengaging the switch 208 will cause the dump cycle to continue from the point at which it previously stopped. For example, after operator 150 stops the dump cycle by disengaging switch 208, operator 150 can reengage the switch 208 to continue the dump cycle from the point at which it was stopped. As previously discussed, in some implementations, the point at which the dump cycle was stopped can be determined by analyzing data provided by the sensors 206, such as arm position sensor 206(1). For example, based on the data received by an onboard computing device (e.g., onboard computing device 112 of FIG. 1A) from arm position sensor 206(1) regarding the angle of the lift arm 204(1) at the time the switch 208 was disengaged, the onboard computing device determines the point in the dump cycle at which the cycle was stopped.

In some implementations, after disengaging switch 208, the operator 150 can engage another switch 248 to reposition the lift arm 204(1) and grabber mechanism 204(2) to a start position for the dump cycle in order to restart the dump cycle 132. For example, after engaging switch 248, the lift arm 204(1) and the grabber mechanism 204(2) are repositioned to a start position for a dump cycle, and the dump cycle can then be restarted by engaging switch 208.

In some instances, the process of moving the lift arm 204(1) and the grabber mechanism 204(2) to a start position for a dump cycle automatically stops upon disengaging the switch 248. For example, if vehicle operator 150 disengages the switch 248 during the process of moving the lift arm 204(1) and the grabber mechanism 204(2) to a start position, the process will automatically stop in its current position and lift arm 204(1) and the grabber mechanism 204(2) will cease movement.

In some implementations, after stopping the process of moving the lift arm 204(1) and the grabber mechanism 204(2) into a start position by disengaging the switch 248, reengaging the switch 248 causes the process to continue to completion as long as the switch 248 continues to remain engaged. In some instances, reengaging the switch 248 will cause the process of moving the lift arm 204(1) and the grabber mechanism 204(2) to a start position to continue from the point at which it previously stopped. For example, after operator 150 stops the process of moving lift arm 204(1) and the grabber mechanism 204(2) to a start position by disengaging the switch 248, the operator 150 can reengage the switch 248 to continue the process from the point at which it was stopped. In some implementations, the point at which the process of moving the lift arm 204(1) and grabber mechanism 204(2) into a start position was stopped can be determined by analyzing data provided by the sensors 206, such as arm position sensor 206(1). For example, based on the data received by the onboard computing device 112 from arm position sensor 206(1) regarding the angle of the lift arm 204(1) and the grabber mechanism 204(2) at the time the switch 248 was disengaged, the onboard computing device 112 determines the point at which the process of moving the lift arm 204(1) into a start position was stopped.

In some instance, after completion of a dump cycle, lift arm 204(1) of the refuse collection vehicle is positioned in a travel position. For example, lift arm 204(1) and grabber mechanism 204(2) of vehicle 202 are placed in a travel position following completion of the dump cycle. In some implementations, the travel position includes the lift arm 204(1) positioned down and adjacent to the body of the vehicle 202 and the grabber mechanism 204(2) positioned in a fully tucked position. In some implementations, the travel position includes positioning the lift arm 204(1) in a support device to prevent damage to the lift arm 204(1) and grabber mechanism 204(2) due to vibrations of the vehicle in transit.

In some instances, the lift arm 204(1) of the refuse collection vehicle will not move into a travel position if a container is detected by the one or more container detection sensors 206(2), 206(3). In some implementations, the lift arm 204(1) will move into a travel position at the end of the dump cycle automatically once a container is no longer detected by the container detection sensors 206(2), 206(3).

In some implementations, the lift arm 204(1) is moved into the travel position based on an operator manually engaging a switch. In some instances, the same switch 108 used to initiate the dump cycle is used to move the lift arm 204(1) into a travel position. In some examples, a separate stow 218 switch is provided for moving the lift arm 204(1) into a travel position.

In some implementations, the process of moving the lift arm 204(1) to a travel position continues to completion as long as the switch remains manually engaged. For example, vehicle operator 150 presses the stow switch 218 to initiate the process of moving the lift arm 204(1) and grabber mechanism 204(2) to a travel position and continues manually engaging (i.e. holding) the stow switch 218 to complete the process.

In some instances, the process of moving the lift arm 204(1) to a travel position automatically stops upon disengaging the switch. For example, if vehicle operator 150 disengages the stow switch 218 during the process of moving the one or more arms to a travel position, the process automatically stops in its current position and lift arm 204(1) ceases movement.

In some implementations, after stopping the process of moving the lift arm 204(1) to a travel position by disengaging the stow switch, reengaging the switch 218 causes the process to continue to completion as long as the switch 218 continues to remain engaged. In some instances, reengaging the switch 218 causes the process of moving the lift arm 204(1) and grabber mechanism to a travel position to continue from the point at which it previously stopped. For example, after operator 150 stops the process of moving the lift arm 204(1) and grabber mechanism 204(2) to a travel position by disengaging the stow switch 218, the operator 150 can reengage the stow switch 218 to continue the process from the point at which it was stopped. In some implementations, the point at which the process of moving the lift arm 204(1) and grabber mechanism 204(2) into a travel position was stopped can be determined by analyzing data provided by the sensors 206, such as arm position sensor 206(1). For example, based on the data received by an onboard computing device from arm position sensor 206(1) regarding the angle of the lift arm 204(1) at the time the stow switch 218 was disengaged, the onboard computing device determines the point at which the process of moving the lift arm 204(1) and grabber mechanism 204(2) into a travel position was stopped Refuse collection vehicles 102, 202 also include one or more environmental monitoring sensors 160. The one or more environmental monitoring sensors 160 are responsive to the proximity of a potential hazard. For example, the environmental monitoring sensors 160 detect whenever an object (e.g., a person, an animal, or a vehicle) has come within the proximity of the vehicle 102, 202 while the vehicle 102, 202 is performing a dump cycle. For example, the environmental monitoring sensors 160 can detect when an object has moved within the path of the lift arm 104(1), 204(1) while the vehicle 102, 202 is performing a dump cycle.

In some implementations, the environmental monitoring sensors 160 send a signal to an onboard computing device of the vehicle 102, 202 (e.g., onboard computing device 112 of FIG. 1A) whenever a potential hazard is detected by the environmental monitoring sensors 160. In response to receiving a signal from one or more environmental monitoring sensors 160 that a potential hazard is detected, the dump cycle is automatically stopped. For example, if one or more of the environmental monitoring sensors 160 detect that an object is within the path of the lift arm (e.g., lift arm 104(1) or 204(1)), the dump cycle is automatically stopped, and movement of the lift arm and grabber mechanism of the vehicle ceases.

In some implementations, after being stopped based on a potential hazard, the dump cycle automatically resumes in response to receiving a signal from one or more of the environmental monitoring sensors 160 indicating that the potential hazard has departed. For example, after stopping the dump cycle in response to one or more environmental monitoring sensors 160 detecting that an object was within the path of the lift arm of the vehicle, the dump cycle automatically resumes upon one or more of the environmental monitoring sensors 160 detecting that the object has moved outside the path of the lift arm 104(1), 204(1), of vehicle 102, 202. As previously discussed, in some implementations, the point at which the dump cycle was stopped can be determined by analyzing data provided by the sensors on the vehicle, such as arm position sensor 106(1). For example, based on the data received by the onboard computing device 112 from arm position sensor 106(1) regarding the angle of the one or more lift arms 104(1) at the time the signal was received from the environmental monitoring sensors 160, the onboard computing device determines the point in the dump cycle at which the cycle was stopped.

Environmental monitoring sensors 160 can include, but are not limited to, an analog sensor, a digital sensor, an infrared sensor, a RADAR sensor, a LIDAR sensor, a CAN bus sensor, an imaging device, a camera, or a combination thereof. For example, environmental monitoring sensors 160 can include one or more ultrasonic sensors.

Figure 5:
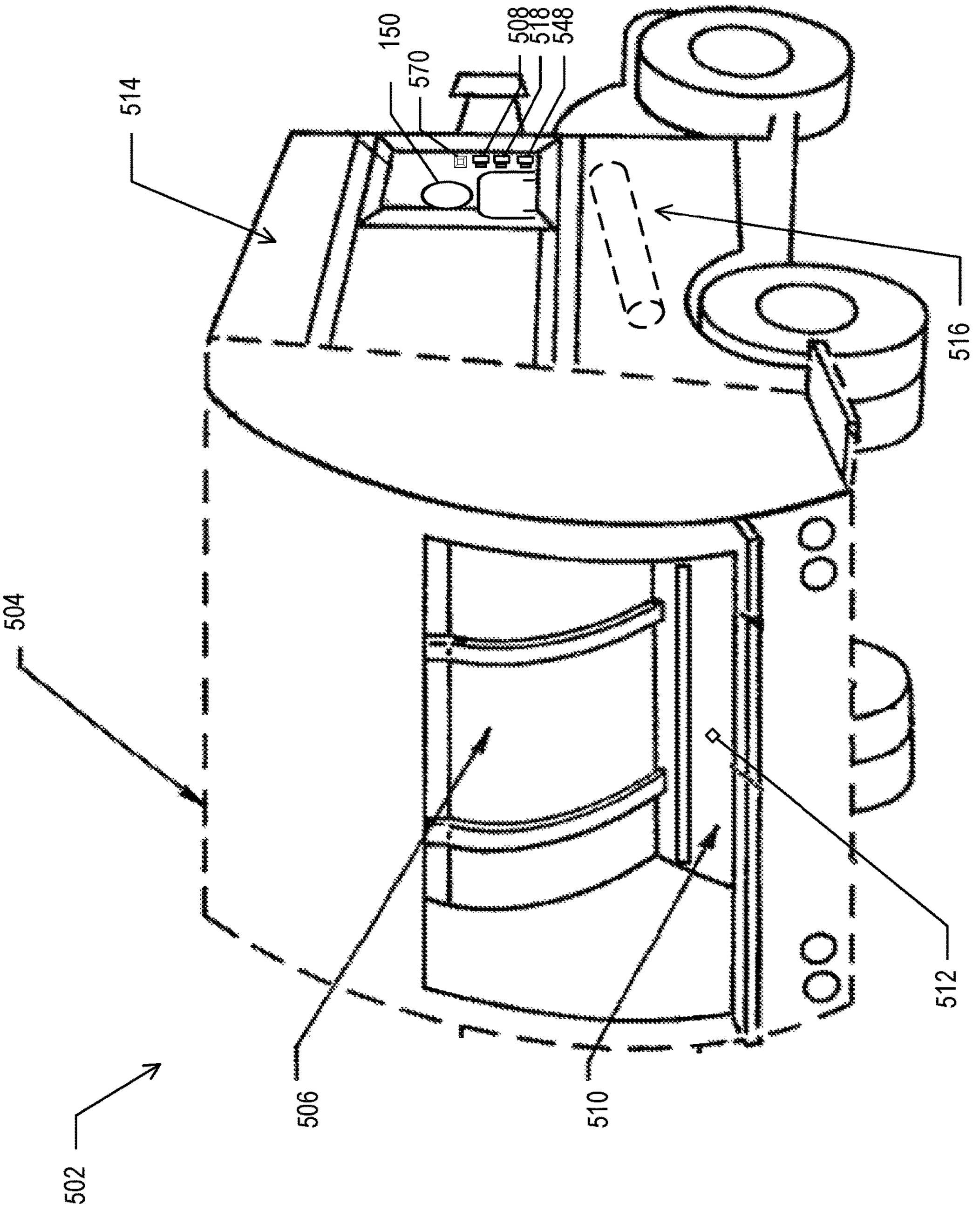
FIG. 5 depicts an exemplary rear-loading refuse collection vehicle configured for performing a compaction cycle and an ejection cycle.

FIG. 5 depicts a rear view of an example schematic of a refuse collection vehicle 502 configured for semi-autonomous compaction and ejection of refuse.

Vehicle 502 includes one or more switches 508, 518, 548 for operation of the vehicle. For example, vehicle 508 includes a switch 508 that, when engaged, initiates a compaction cycle, as described in further detail herein. To perform a compaction cycle, a vehicle operator 150 manually engages a switch to initiate a compaction cycle to be performed by a refuse collection vehicle 502 on the contents of a hopper 510 of the vehicle 502. For example, vehicle operator 150 can manually engage switch 508 to initiate a compaction cycle to be performed by tailgate packer 506 on the contents of hopper 510. In some implementations, a switch 518 is provided in vehicle 502 to initiate an ejection cycle to empty compacted contents of body 514. In some implementations, a switch 548 is provided in vehicle 502 to reposition the ejection cylinder 516 to a starting or initial position to conduct an ejection cycle (e.g., a "reset" switch).

Switches 508, 518, 548 can include, but are not limited to, push buttons. In some implementation, switches 508, 518, 548 are provided as spring-loaded, momentary contact buttons. In some implementations, switches 508, 518, 548 are provided as potted and sealed LED illuminated push buttons with finger guards. For example, manually engaging switch 508 includes pressing and holding switch 508 throughout the compaction cycle. In some implementations, the one or more switches 508, 518, 548 may be incorporated into the various body components. For example, switch 508, 518, 548 can be incorporated into a dashboard of the cab of the vehicle 502. In some implementations, switches 508, 518, 548 can be incorporated into a joystick located in the cab of the vehicle 502. In some implementations, switches 508, 518, 548 are provided as foot pedals positioned on the floorboard of the vehicle 502, and manually engaging the switches 508, 518, 548 includes the operator depressing the pedal incorporating respective switch 508, 518, 548 with his or her foot. Alternatively, the one or more switches 508, 518, 548 may be separate from the body components. For example, either of switches 508, 548 may be incorporated in a remote that is detachable from the vehicle 502. In some implementations, at least one of switches 508, 518, 548 is located outside of the vehicle 502 and communicably coupled to the vehicle 502 such that a remote operator can engage a switch 508, 518, 548 to remotely initiate a cycle to be performed by the vehicle 502.

Manual engagement of switch 508 by vehicle operator 150 initiates a compaction cycle. In some implementations, the compaction cycle includes retracting the packer to "home position." In some implementations, the "home position" of the packer 506 allows for additional refuse to be added to the hopper 510. In some implementations, one or more sensors 512 are configured to detect that the packer is located in a home position. Sensors 512 for detecting that the packer is in a home position can include, but are not limited to, mechanical plunger, a contact sensor, an analog sensor, a digital sensor, a CAN bus sensor, a RADAR sensor, a LIDAR sensor, an ultrasonic sensor, a camera, or a combination thereof. In some implementations, one or more analog sensors 512 monitor the movement of the packer and detect that the packer is in a home position.

In some implementations, the compaction cycle continues to completion as long as the switch 508 remains manually engaged. For example, vehicle operator 150 presses switch 508 to initiate the compaction cycle and continues manually engaging (i.e. holding) the switch 508 throughout each step of the compaction cycle. In some instances, the compaction cycle automatically stops upon disengaging the switch. For example, if vehicle operator 150 disengages switch 508 during the compaction cycle, the packer 506 will automatically stop in its current position and cease movement.

In some implementations, after stopping the compaction cycle by disengaging the switch 508, reengaging the switch 508 causes the compaction cycle to continue to completion as long as the switch 508 continues to remain engaged. In some instances, reengaging the switch 508 will cause the compaction cycle to continue from the point at which it previously stopped. For example, after operator 150 stops the compaction cycle by disengaging switch 508, operator 150 can reengage the switch 508 to continue the compaction cycle from the point at which it was stopped. In some implementations, the point at which the compaction cycle was stopped can be determined by analyzing data provided by the sensors 512. For example, based on the data received by the onboard computing device 112 from the one or more sensors 512 regarding the location of the compaction cylinder and the pressure of the hopper 510 at the time the switch was disengaged, the onboard computing device determines the point in the compaction cycle at which the cycle was stopped.

In some implementations, a light 570 inside the refuse collection vehicle indicates that the compaction cycle is complete. For example, a ring of light-emitting diode (LED) lights surrounding switch 508 illuminates or changes color to indicate that the compaction cycle is complete. In some implementations, a light 570 inside the refuse collection vehicle indicates that the compaction cycle is complete at least in part based on a determination by one or more sensors 512 that the hopper is empty or the packer 506 has returned to its starting position.

Manual engagement of switch 518 by vehicle operator 150 initiates an ejection cycle. In some implementations, the ejection cycle includes automatically unlocking a tailgate 504 of the vehicle 502. For example, tailgate 504 is automatically unlocked in response to vehicle operator 150 manually engaging switch 518 to initiate an ejection cycle.

The ejection cycle can further include raising the tailgate 504. For example, tailgate 504 is raised to a predetermined ejection position. In some implementations, the tailgate is raised based at least in part on a determination that the tailgate is not locked and the body 514 of the vehicle has met a threshold body pressure. For example, tailgate 504 raises at least in part based on a determination by an onboard computing device (e.g., computing device 112) that the tailgate 504 is unlocked and a threshold pressure of body 514 has been reached based on sensor data provided by one or more sensors 512. For example, tailgate 504 raises at least partly in response to the one or more sensors 512 detecting that tailgate 504 is unlocked and the pressure of the body 514 is at least 2400 PSI for at least 1.5 seconds.

Sensors 512 can include, but are not limited to, a mechanical plunger, a contact sensor, an analog sensor, a digital sensor, a CAN bus sensor, a RADAR sensor, a LIDAR sensor, an ultrasonic sensor, a camera, or a combination thereof. For example, sensor 512 can include one or more pressure sensors.

The ejection cycle can also include moving an ejection cylinder 516 coupled to a body component (not shown) of the refuse collection vehicle 502 to eject the contents of the body 514 of the refuse collection vehicle 502. For example, in response to tailgate 504 being unlocked and raised, the ejection cylinder 516 is moved to eject the contents of the body 514 from the vehicle 502. In some implementations, moving the ejection cylinder 516 to eject the contents of the body 514 includes extending and retracting the ejection cylinder 516 one or more times to eject the contents of body 514 of the refuse collection vehicle 502. For example, ejection cylinder 516 can be repeatedly extended to a full eject position and retracted to a second position that is a predetermined distance from the full eject position in order to eject the contents of body 514 of the vehicle 502. In some implementations, the second position may be configurable. For example, vehicle operator 150 can set the predetermined distance of the second position. In some implementations, a light 570 within the vehicle 502 indicates the ejection cylinder 516 position. For example, light 570 is illuminated yellow when the ejection cylinder 516 is moving from the full eject position to the second position (i.e. retracting) and is illuminated green when ejection cylinder 516 is moving from the second position to the full eject position (i.e. extending).

In some implementations, the ejection cylinder of the vehicle is coupled to a packer of the vehicle, and the ejection cylinder of the vehicle is extended and retracted to move the packer to eject refuse from the body of the vehicle. For example, in some ASL vehicles and FEL vehicles, the ejection cylinder is coupled to the packer of the vehicle as seen in FIG. 1B, and refuse is ejected from the vehicle by moving the packer via extension and retraction of the ejection cylinder 104(6).

In some implementations, the ejection cylinder 516 is moved to eject refuse from the body 514 based at least in part on a determination that the tailgate 504 is not lowered and that the body 514 of the vehicle 502 has met a threshold body pressure. For example, ejection cylinder 516 moves to eject refuse at least in part based on a determination by an onboard computing device (e.g., computing device 112) that the tailgate 504 is not lowered and a threshold pressure of body 514 has been reached based on sensor data provided by one or more sensors 512. For example, ejection cylinder 516 moves to eject refuse at least partly in response to the one or more sensors 512 detecting that tailgate 504 is not lowered and that the pressure of the body 514 is at least 2500 PSI for at least 1.5 seconds.

In some implementations, the ejection cycle includes lowering the tailgate 504 to a closed position. For example, following ejection of the refuse from body 514, tailgate 504 is automatically lowered to a closed position. In some instances, the ejection cycle includes locking the tailgate. For example, tailgate 504 is automatically locked based at least on a determination by sensors 512 that the tailgate 504 is lowered. In some implementations, tailgate 504 is automatically locked based on detection by a high-pressure analog sensor 512 that the tailgate 504 is lowered. In some implementations, tailgate 504 is automatically locked based on detection by a CAN bus sensor that the tailgate 504 is lowered.

In some implementations, the ejection cycle continues to completion as long as the switch 518 remains manually engaged. For example, vehicle operator 150 presses switch 518 to initiate the ejection cycle and continues manually engaging (i.e. holding) the switch 518 throughout each step of the ejection cycle. In some instances, the ejection cycle automatically stops upon disengaging the switch. For example, if vehicle operator 150 disengages switch 518 during the ejection cycle, the ejection cylinder 516 will automatically stop in its current position and cease movement.

In some implementations, after stopping the ejection cycle by disengaging the switch 518, reengaging the switch 518 causes the ejection cycle to continue to completion as long as the switch 518 continues to remain engaged. In some instances, reengaging the switch 518 will cause the ejection cycle to continue from the point at which it previously stopped. For example, after operator 150 stops the ejection cycle by disengaging switch 518, operator 150 can reengage the switch 518 to continue the ejection cycle from the point at which it was stopped. In some implementations, the point at which the ejection cycle was stopped can be determined by analyzing data provided by the sensors 512. For example, based on the data received by the onboard computing device 112 from the one or more sensors 512 regarding the location of the ejection cylinder 516 and the pressure of the body 514 at the time the switch was disengaged, the onboard computing device determines the point in the ejection cycle at which the cycle was stopped.

In some implementations, after disengaging switch 518, the operator 150 can engage another switch 548 to reposition the ejection cylinder 516 to a start position for the ejection cycle in order to restart the ejection cycle. For example, after engaging switch 548, ejection cylinder 516 is repositioned to a start position for an ejection cycle, and the ejection cycle can then be restarted by engaging switch 518.

In some instances, the process of moving the ejection cylinder 516 to a start position for an ejection cycle automatically stops upon disengaging the switch 548. For example, if vehicle operator 150 disengages the switch 548 during the process of moving the ejection cylinder 516 to a start position, the process will automatically stop in its current position and the ejection cylinder 516 will cease movement.

In some implementations, after stopping the process of moving the ejection cylinder 516 into a start position by disengaging the switch 548, reengaging the switch 548 causes the process to continue to completion as long as the switch 548 continues to remain engaged. In some instances, reengaging the switch 548 will cause the process of moving the ejection cylinder 516 to a start position to continue from the point at which it previously stopped. For example, after operator 150 stops the process of moving the ejection cylinder 516 to a start position by disengaging the switch 548, the operator 150 can reengage the switch 548 to continue the process from the point at which it was stopped. In some implementations, the point at which the process of moving the ejection cylinder 516 into a start position was stopped can be determined by analyzing data provided by the sensors. For example, based on the data received by the onboard computing device 112 from a sensor regarding the portion of the ejection cylinder 516 at the time the switch 548 was disengaged, the onboard computing device 112 determines the point at which the process of moving the ejection cylinder 516 into a start position was stopped.

In some implementations, a light 570 inside the refuse collection vehicle indicates that the ejection cycle is complete. For example, a ring of light-emitting diode (LED) lights surrounding switch 518 illuminates or changes color to indicate that the ejection cycle is complete. In some implementations, a light 570 inside the refuse collection vehicle indicates that the ejection cycle is complete at least in part based on a determination by one or more sensors 512 that the tailgate is locked.

Figure 6:
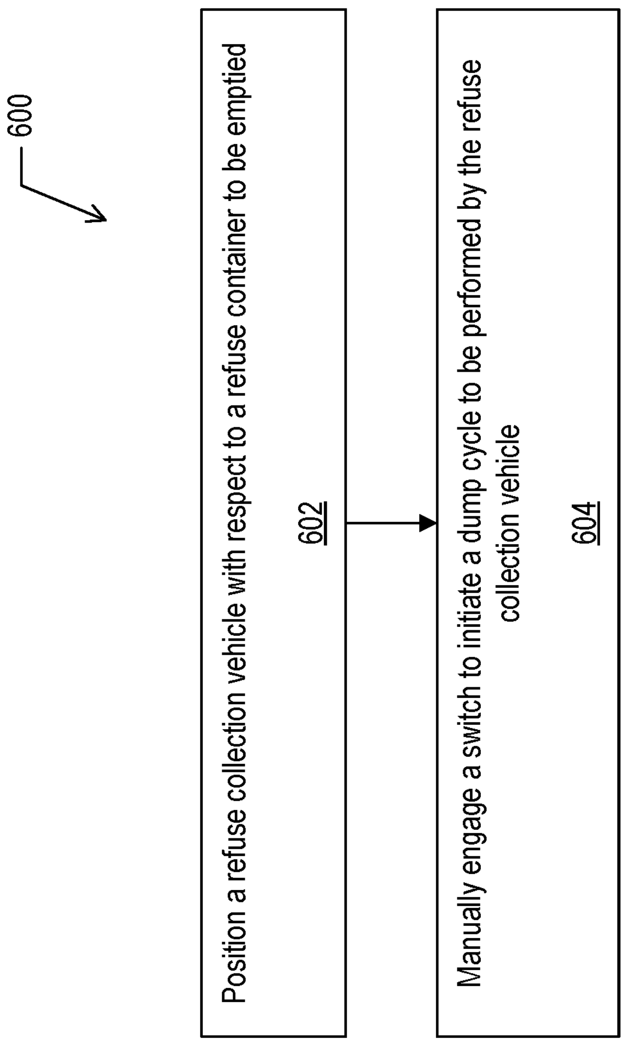
FIGS. 6 and 7 depict flow diagrams of example processes for operating a refuse collection vehicle to collect refuse from a refuse container, according to the present disclosure.

FIG. 6 depicts a flow diagram of an example process for operating a refuse collection vehicle to collect refuse from a refuse container, according to the present disclosure.

A refuse collection vehicle is positioned with respect to a refuse container to be emptied (602). As previously discussed, positioning the refuse collection vehicle with respect to a refuse container to be emptied can include positioning the refuse collection vehicle such that a plurality of sensors (e.g., container detection sensors 106 and 206 of FIGS. 1 and 2, respectively) on the vehicle are positioned to detect the refuse container. In some implementations, positioning the refuse collection vehicle with respect to a refuse container to be emptied can include positioning the refuse collection vehicle such that a plurality of sensors detect that the forks of the vehicle are engaged with pockets of a refuse container. In some examples, positioning the refuse collection vehicle with respect to a refuse container to be emptied can include positioning the refuse collection vehicle such that a plurality of sensors detect a detection zone of the container. The sensors can include, but are not limited to, a mechanical plunger, a contact sensor, an analog sensor, a digital sensor, a CAN bus sensor, a RADAR sensor, a LIDAR sensor, an ultrasonic sensor, a camera, or a combination thereof.

As previously discussed, positioning the refuse collection vehicle with respect to a refuse container to be emptied can include positioning the refuse collection vehicle in a fore-aft direction while observing images on a graphical display within the vehicle (e.g., graphical display 220 of FIGS. 2A-2C) obtained from a camera directed at the refuse container to align a feature of an image of the refuse container on the graphical display with a visual marker (e.g., visual markers 404 of FIGS. 4A and 4B) positioned on the graphical display.

In some implementations, positioning the vehicle can be based at least in part on comparing the current location of the vehicle with data set of known container locations. For example, as previously discussed, positioning the vehicle can be based at least in part adjusting the lift arm and/or grabber mechanism of the vehicle to previously recorded positions based on a prior engagement and dump cycle of a container at the current GPS location of the vehicle.

A switch is manually engaged to initiate a dump cycle to be performed by the refuse collection vehicle (604). As previously discussed, in some implementations, the switch becomes energized when a refuse container is detected by one or more of the sensors. In some instances, a light inside the vehicle indicates that the switch is energized.

The dump cycle can include engaging the refuse container with a portion of the vehicle, lifting the engaged refuse container to a dump position, and moving the refuse container to release contents of the refuse container into a hopper of the refuse collection vehicle.

As previously discussed, engaging the refuse container with a portion of the vehicle can include extending an arm of the refuse collection vehicle outward from the refuse collection vehicle until the refuse container is detected by at least one of a plurality of sensors. In some implementations, one or more grippers of the arm move toward the refuse container in response to detection of the refuse container by a sensor carried on the refuse collection vehicle. The one or more grippers can continue to move toward the refuse container until a threshold pressure applied to the refuse container by the arm is reached.

As previously discussed, lifting the container to a dump position can include leveling the refuse container to prevent the contents of the refuse container from spilling. In some implementations, the refuse container can be leveled when the container is lifted to a height within a predetermined leveling range. In some implementations, the vehicle continuously levels the container while it is being lifted to a dump position. In some instances, the container is leveled when the refuse container is lifted to an elevation corresponding to a top of a windshield of the refuse collection vehicle.

In some implementations, moving the refuse container to release contents of the refuse container into a hopper of the refuse collection vehicle includes pivoting the refuse container one or more times to dump the contents to a specified location in the hopper of refuse collection vehicle. For example, a rotary actuator of grabber mechanism 204(2) of vehicle 202 can pivot refuse container one or more times. In some implementations, moving the refuse container to release contents of the refuse container into a hopper of the refuse collection vehicle includes raising and lowering the refuse container one or more times to dump the contents to a specified location in the hopper of refuse collection vehicle. For example, fork mechanism 104(2) of vehicle 102 can raise and lower refuse container 130 one or more times to release the contents of the container 130. In some implementations, there is a predetermined delay between the one or more movements (i.e., pivots or raises) of the refuse container. In some implementations, the predetermined delay is provided by an operator of the vehicle 102. In some implementations, a switch (e.g., switch 158 of FIG. 1) is provided to cause the refuse container to be pivoted one or more times to ensure complete dumping of the container into the vehicle.

In some implementations, the dump cycle also includes recording a pick position of the refuse container before lifting the container, and lowering the container to the recorded pick position after moving the refuse container to the release the contents. As previously discussed, lowering the refuse container to the previously recorded pick position reduces the likelihood of causing damage to the refuse container or the vehicle by ensuring that the refuse container is placed in the same position it was located in prior to engagement without application of unnecessary force to the container or placement of the container on uneven surfaces.

In some implementations, the refuse collection vehicle performing dump cycle contains an environmental monitoring sensor responsive to the proximity of a potential hazard, and the dump cycle is automatically stopped in response to receiving a signal from the environmental monitoring sensor. In some instances, the stopped dump cycle automatically resumes in response to a signal from the environmental monitoring sensor indicating that the potential hazard has departed.

As previously discussed, in some implementations, the dump cycle is automatically stopped upon disengaging the switch. In some instances, reengaging the switch causes the stopped dump cycle to continue to completion as long as the switch remains manually engaged.

As previously discussed, after completion of the dump cycle, an arm of the vehicle can be positioned in a travel position. In some implementations, positioning an arm of the refuse collection vehicle in a travel position includes engaging a second switch (e.g. switch 118 of FIG. 1).

Figure 7:
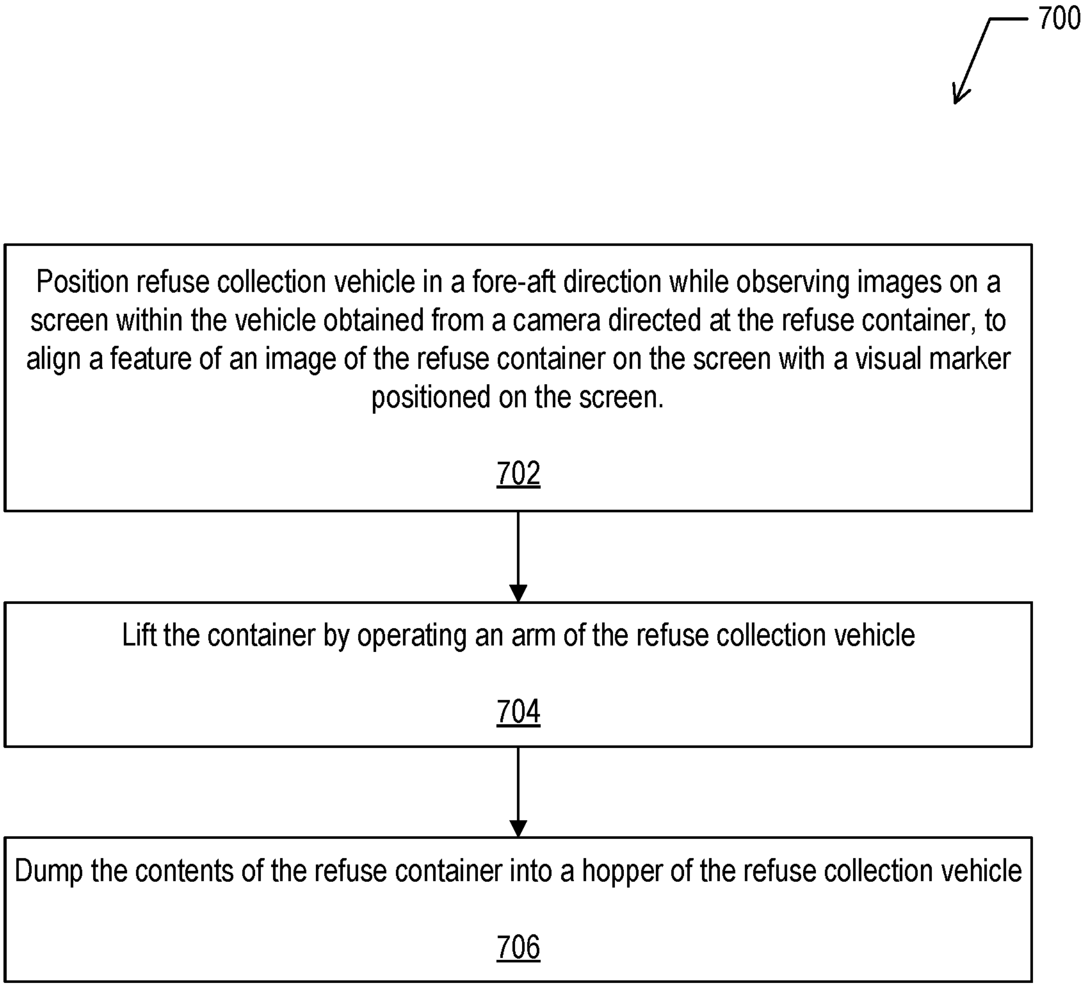

FIG. 7 depicts a flow diagram of an example process for operating a refuse collection vehicle to collect refuse from a refuse container.

A refuse collection vehicle is positioned in a fore-aft direction while observing images on a graphical display within the vehicle (e.g., graphical display 220 of FIGS. 2A-2C) obtained from a camera directed at the refuse container (e.g., camera 234(1) of FIGS. 2A-2C), to align a feature of an image of the refuse container on the graphical display with a visual marker positioned on the graphical display (702). As previously discussed, the visual marker can include a first guideline and a second guideline (e.g., visual markers 404(1*a*) and 404(1*b*) of FIG. 4A). In some implementations, the distance on the graphical display between the first guideline and the second guideline is greater than or equal to a distance between a first side of the image of the refuse container on the graphical display and a second side of the image of the refuse container on the graphical display. In some instances, positioning the vehicle includes aligning the image of the refuse container between the first guideline and the second guideline. As previously discussed, the visual marker can further include a third guideline disposed equidistant between the first guideline and second guideline (e.g., visual marker 404(1*c*) of FIG. 4A). In some implementations, positioning the vehicle includes aligning a centerline of the image of the refuse container with the third guideline. In some instances, the length of the guidelines represent the distance that the arm and/or grabber mechanism can reach to engage a container. In some implementations, the visual marker is provided as solid area (e.g., visual marker 404(2) of FIG. 4B) that represents the area in which a refuse container can be engaged by the vehicle.

As previously discussed, in some implementations, the images captured by a camera (e.g., camera 234(1) of FIGS. 2A-2C) on the vehicle and a visual marker (e.g., visual markers 404(1*a*) and 404(1*b*) of FIG. 4A) are provided to a device worn by the operator of the vehicle. The images captured by the camera and the visual marker can also be provided to other virtual reality or augmented reality devices provided to or worn by the operator of the vehicle.

The container is lifted by operating an arm of the refuse collection vehicle (704). As previously discussed, in some implementations, lifting the container includes leveling the container as it is being lifted to a dump position to prevent the contents of the container from spilling.

Figure 8:
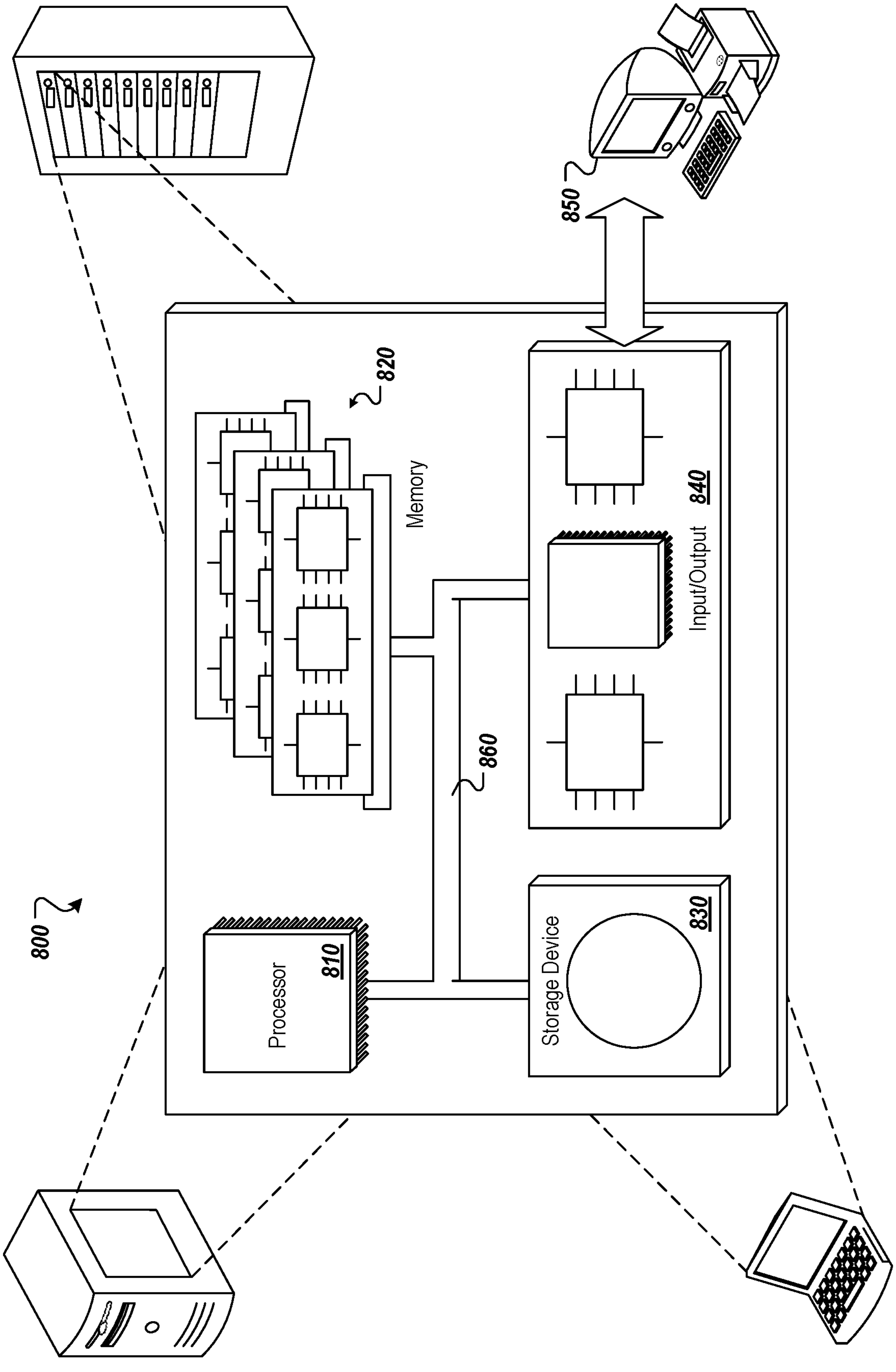
FIG. 8 depicts an example computing system, according to implementations of the present disclosure.

The contents of the refuse container are dumped into a hopper of the refuse collection vehicle (706). As previously discussed, dumping the refuse container can include moving the refuse container one or more times. For example, the refuse container can be pivoted, or raised and lowered, one or more times to dump the content of the container. In some implementations, the container is moved to dump its contents into a specified location in the hopper. In some implementations, a switch (e.g., switch 158 of FIG. 1) is provided to cause the refuse container to be pivoted one or more times to ensure complete dumping of the container into the vehicle FIG. 8 depicts an example computing system, according to implementations of the present disclosure. The system 800 may be used for any of the operations described with respect to the various implementations discussed herein. For example, the system 800 may be included, at least in part, in one or more of the onboard computing device 112, and/or other computing device(s) or system(s) described herein. The system 800 may include one or more processors 810, a memory 820, one or more storage devices 830, and one or more input/output (I/O) devices 850 controllable via one or more I/O interfaces 840. The various components 810, 820, 830, 840, or 850 may be interconnected via at least one system bus 860, which may enable the transfer of data between the various modules and components of the system 800.

The processor(s) 810 may be configured to process instructions for execution within the system 800. The processor(s) 810 may include single-threaded processor(s), multi-threaded processor(s), or both. The processor(s) 810 may be configured to process instructions stored in the memory 820 or on the storage device(s) 830. For example, the processor(s) 810 may execute instructions for the various software module(s) described herein. The processor(s) 810 may include hardware-based processor(s) each including one or more cores. The processor(s) 810 may include general purpose processor(s), special purpose processor(s), or both.

The memory 820 may store information within the system 800. In some implementations, the memory 820 includes one or more computer-readable media. The memory 820 may include any number of volatile memory units, any number of non-volatile memory units, or both volatile and non-volatile memory units. The memory 820 may include read-only memory, random access memory, or both. In some examples, the memory 820 may be employed as active or physical memory by one or more executing software modules.

The storage device(s) 830 may be configured to provide (e.g., persistent) mass storage for the system 800. In some implementations, the storage device(s) 830 may include one or more computer-readable media. For example, the storage device(s) 830 may include a floppy disk device, a hard disk device, an optical disk device, or a tape device. The storage device(s) 830 may include read-only memory, random access memory, or both. The storage device(s) 830 may include one or more of an internal hard drive, an external hard drive, or a removable drive.

One or both of the memory 820 or the storage device(s) 830 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 800. In some implementations, the CRSM may include a data store that provides storage of computer-readable instructions or other information in a non-transitory format. The CRSM may be incorporated into the system 800 or may be external with respect to the system 800. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 810 and the memory 820 may be supplemented by, or incorporated into, one or more application-specific integrated circuits (ASICs).

The system 800 may include one or more I/O devices 850. The I/O device(s) 850 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 850 may also include one or more output devices such as a display, LED(s), an audio output device (e.g., a speaker), a printer, a haptic output device, and so forth. The I/O device(s) 850 may be physically incorporated in one or more computing devices of the system 800, or may be external with respect to one or more computing devices of the system 800.

The system 800 may include one or more I/O interfaces 840 to enable components or modules of the system 800 to control, interface with, or otherwise communicate with the I/O device(s) 850. The I/O interface(s) 840 may enable information to be transferred in or out of the system 800, or between components of the system 800, through serial communication, parallel communication, or other types of communication. For example, the I/O interface(s) 840 may comply with a version of the RS-232 standard for serial ports, or with a version of the IEEE 1284 standard for parallel ports. As another example, the I/O interface(s) 840 may be configured to provide a connection over Universal Serial Bus (USB) or Ethernet. In some examples, the I/O interface(s) 840 may be configured to provide a serial connection that is compliant with a version of the IEEE 1394 standard.

The I/O interface(s) 840 may also include one or more network interfaces that enable communications between computing devices in the system 800, or between the system 800 and other network-connected computing systems. The network interface(s) may include one or more network interface controllers (NICs) or other types of transceiver devices configured to send and receive communications over one or more communication networks using any network protocol.

Computing devices of the system 800 may communicate with one another, or with other computing devices, using one or more communication networks. Such communication networks may include public networks such as the internet, private networks such as an institutional or personal intranet, or any combination of private and public networks. The communication networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 800 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Although examples herein may show and/or describe implementations for particular types of RCVs, implementations are not limited to these examples. The structures and/or methods described herein can apply to any suitable type of RCV, including front-loader, rear-loader, side-loader, roll-off, and so forth, with or without Curotto-Can™, carry can, and so forth.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claim(s).

What is claimed is:

1. A computer-implemented method of operating a refuse collection vehicle to eject refuse from a body of the refuse collection vehicle, the method performed by at least one computer device, the method comprising:
- responsive to a detected engaging of a switch, initiating an ejection cycle to be performed by the refuse collection vehicle on the refuse in the body;
- responsive to a detected disengaging of the switch, causing the refuse collection vehicle to automatically stop the ejection cycle;
- determining a point at which the ejection cycle was stopped based at least partly on data collected by one or more sensors on the refuse collection vehicle; and
- responsive to a detected reengaging of the switch subsequent to the detected disengaging, causing the refuse collection vehicle to continue the ejection cycle from the point at which the ejection cycle was stopped, wherein the ejection cycle continues to completion as long as the switch remains reengaged.

2. The method of claim 1, wherein the ejection cycle comprises:
- moving an ejection cylinder of the refuse collection vehicle to eject at least a portion of the refuse.

3. The method of claim 2, wherein ejecting the at least a portion of the refuse comprises moving a packer coupled to the ejection cylinder to eject the at least a portion of the refuse from the body of the refuse collection vehicle.

4. The method of claim 2, wherein moving the ejection cylinder of the refuse collection vehicle to eject the at least a portion of the refuse comprises extending and retracting the ejection cylinder one or more times to eject the at least a portion of the refuse from the body of the refuse collection vehicle.

5. The method of claim 4, wherein the ejection cylinder extends to a full eject position and retracts to a second position, the second position being a predetermined distance from the full eject position.

6. The method of claim 5, further comprising receiving, from an operator of the refuse collection vehicle, the predetermined distance for the second position.

7. The method of claim 2, further comprising responsive to a detected engaging of a second switch, causing the ejection cylinder to move to a start position.

8. The method of claim 1, wherein the ejection cycle comprises unlocking a tailgate of the refuse collection vehicle.

9. The method of claim 1, wherein the ejection cycle comprises lifting a tailgate of the refuse collection vehicle.

10. The method of claim 1, wherein the ejection cycle comprises lowering a tailgate of the refuse collection vehicle to a closed position.

11. The method of claim 1, wherein the ejection cycle comprises locking a tailgate of the refuse collection vehicle.

12. The method of claim 1, wherein the data collected by the one or more sensors on comprises a location of an ejection cylinder of the refuse collection vehicle when the switch was disengaged.

13. The method of claim 1, wherein the data collected by the one or more sensors comprises a pressure within the body when the switch was disengaged.

14. The method of claim 1, wherein initiating the ejection cycle to be performed by the refuse collection vehicle on the refuse in the body comprises determining that a tailgate of the refuse collection vehicle is not lowered.

15. The method of claim 1, wherein initiating the ejection cycle to be performed by the refuse collection vehicle on the refuse in the body comprises determining that a pressure within the body of the refuse collection vehicle exceeds a threshold pressure.

16. The method of claim 1, further comprising, in response to detecting completion of the ejection cycle, causing a light inside the refuse collection vehicle to illuminate to indicate that the ejection cycle is complete.

17. A system comprising:
- at least one processor; and
- memory communicably coupled to the at least one processor, the memory storing instructions which, when executed, cause the at least one processor to perform operations comprising:
  - responsive to a detected engaging of a switch, initiating an ejection cycle to be performed by a refuse collection vehicle on refuse in a body of the refuse collection vehicle;
  - responsive to a detected disengaging of the switch, causing the refuse collection vehicle to automatically stop the ejection cycle;
  - determining a point at which the ejection cycle was stopped, based at least partly on data collected by one or more sensors on the refuse collection vehicle; and
  - responsive to a detected reengaging of the switch subsequent to the detected disengaging, causing the refuse collection vehicle to continue the ejection cycle from the point at which the ejection cycle was stopped, wherein the ejection cycle continues to completion as long as the switch remains reengaged.

18. The system of claim 17, wherein the data collected by the one or more sensors on comprises one or more of (i) a location of an ejection cylinder of the refuse collection vehicle when the switch was disengaged, or (ii) a pressure within the body when the switch was disengaged.

19. The system of claim 17, wherein initiating the ejection cycle to be performed by the refuse collection vehicle on the refuse in the body comprises one or more of (i) determining that a tailgate of the refuse collection vehicle is not lowered, or (ii) determining that a pressure within the body of the refuse collection vehicle exceeds a threshold pressure.

20. The system of claim 17, wherein the at least one processor is disposed on board the refuse collection vehicle.

* * * * *